United States Patent [19]
Yoshida et al.

[11] Patent Number: 5,551,679
[45] Date of Patent: Sep. 3, 1996

[54] FACSIMILE-LIKE RECORDING APPARATUS WITH OUT-OF-STAPLES OPERATION

[75] Inventors: Takehiro Yoshida, Tokyo; Shoji Miyake, Yokohama, both of Japan

[73] Assignee: Canon Kabushiki Kaisha, Tokyo, Japan

[21] Appl. No.: 903,289

[22] Filed: Jun. 24, 1992

[30] Foreign Application Priority Data

Jun. 25, 1991 [JP] Japan .................................. 3-153130
Sep. 20, 1991 [JP] Japan .................................. 3-268698
Jan. 24, 1992 [JP] Japan .................................. 4-034470

[51] Int. Cl.⁶ .............................. B42B 5/00; H04N 1/00; H04M 11/00
[52] U.S. Cl. ................ 270/58.09; 355/324; 358/404; 379/100
[58] Field of Search .................. 270/1.1, 53, 58; 355/324, 310; 400/621; 358/404, 437, 444; 395/115, 116

[56] References Cited

U.S. PATENT DOCUMENTS

| | | | |
|---|---|---|---|
| 4,360,263 | 11/1982 | Miyoshi et al. | 355/310 X |
| 4,424,963 | 1/1984 | Bartholet et al. | 270/53 |
| 4,501,490 | 2/1985 | Miyamoto et al. | 355/324 X |
| 4,523,750 | 6/1985 | Hubler | 270/53 |
| 4,763,167 | 8/1988 | Watanabe et al. | 355/324 X |
| 4,835,573 | 5/1989 | Rohrer et al. | 355/77 X |
| 4,864,350 | 9/1989 | Ishiguro et al. | 270/53 X |
| 4,905,054 | 2/1990 | Rood | 355/324 |
| 4,917,366 | 4/1990 | Murakami et al. | |
| 4,920,427 | 4/1990 | Hirata | 358/437 |
| 4,935,955 | 6/1990 | Neudorfer | 358/402 X |
| 4,946,154 | 8/1990 | Nakamura | 270/58 X |
| 5,060,922 | 10/1991 | Shibusawa et al. | 270/58 X |
| 5,072,920 | 12/1991 | Kubota et al. | 270/53 |
| 5,075,782 | 12/1991 | Tufano et al. | 358/444 X |
| 5,140,380 | 8/1992 | Nakamura et al. | 355/324 |
| 5,187,534 | 2/1993 | Iwata et al. | 355/324 |
| 5,320,335 | 6/1994 | Iwata et al. | 270/53 |

FOREIGN PATENT DOCUMENTS 62-38656 2/1987 Japan .
269852 11/1987 Japan ...................................... 270/53

Primary Examiner—John Ryznic
Attorney, Agent, or Firm—Fitzpatrick, Cella, Harper & Scinto

[57] ABSTRACT

A recording apparatus having a recording unit for recording images of documents on a lengthwise recording sheet or a plurality of cut recording sheets, a cutter for cutting the lengthwise recording sheet by a length corresponding to one page or the overall length of each document, and a binding device for binding with a binding member a plurality of cut recording sheets on which a group of images of each document are recorded. The group of images is recorded on one recording sheet or image data is stored in a memory, if no staple is left. The stapling position can be changed according to the selected size and orientation of recording sheets and the orientation of recorded images.

36 Claims, 20 Drawing Sheets

FIG. 17(A)
TRANSMITTER SIDE
RECEIVER SIDE
STAPLE
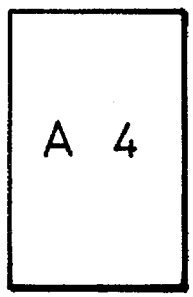
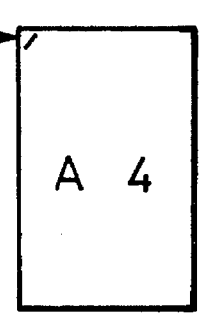
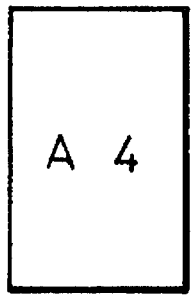
FIG. 17(B)
TRANSMITTER SIDE
RECEIVER SIDE
STAPLE
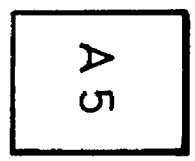
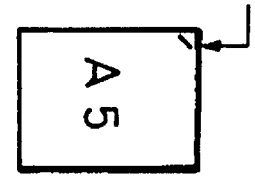
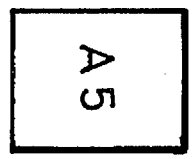

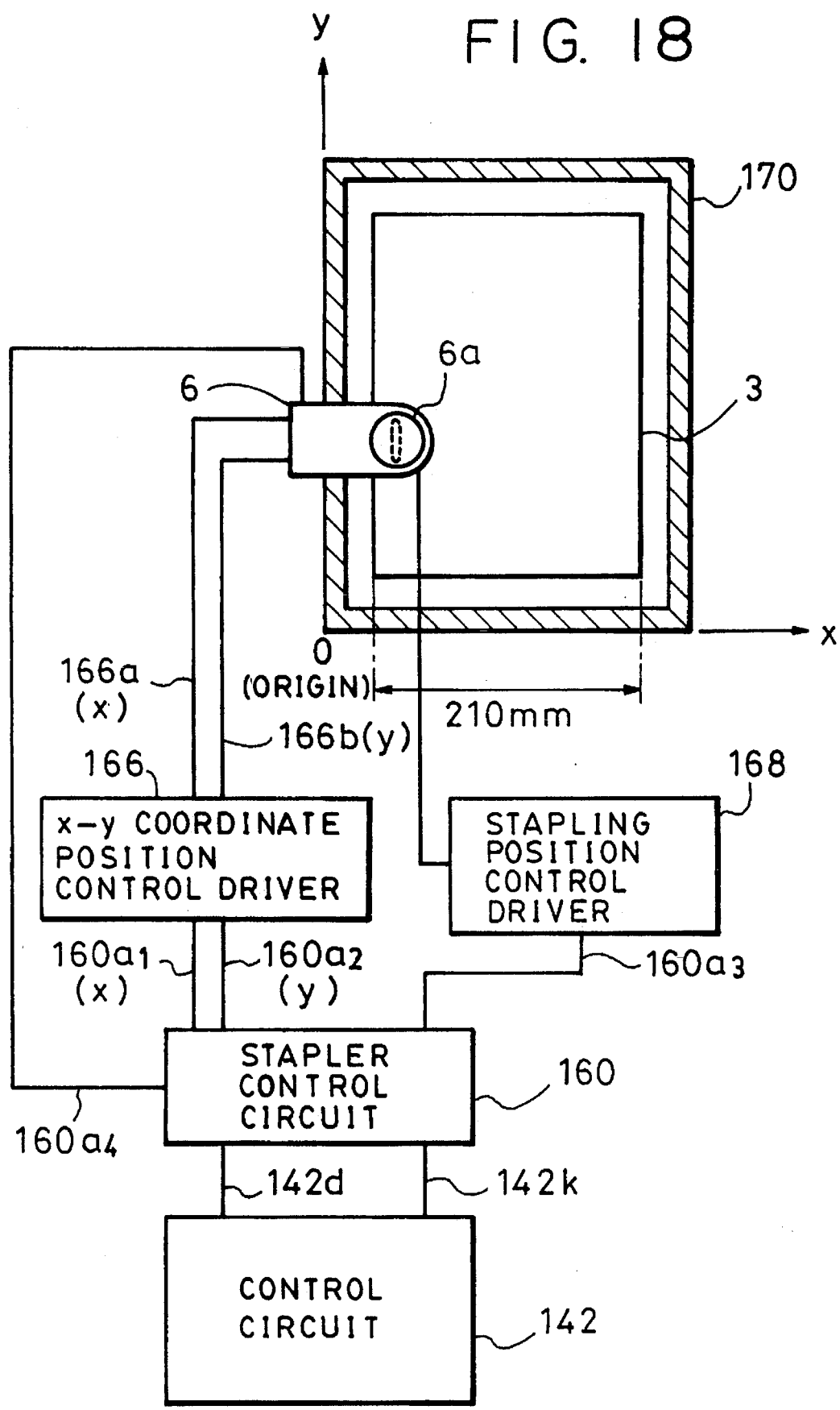

FIG. 19

| DIRECTION DESIGNATION DATA | ORIENTATION OF STAPLE |
|---|---|
| 0 | — |
| 1 | \| |
| 2 | \ |
| 3 | / |

FIG. 20

| OBVERSE SURFACE OF ORIGINAL (RECORDING SHEET) | REVERSE SIDE OF ORIGINAL (RECORDING SHEET) | STAPLING POSITION (x,y) UNIT=mm | ORIENTATION OF STAPLE |
|---|---|---|---|
| A4 | ⱯV | 0 , 0 | 2 |
| A5 | ꓢⱯ | 210 , 0 | 3 |

FIG. 21

| OBVERSE SURFACE OF ORIGINAL | REVERSE SIDE OF ORIGINAL | STAPLING POSITION (x,y) UNIT = mm | ORIENTATION OF STAPLE |
|---|---|---|---|
| A4 LEFT TOP | A4 LEFT BOTTOM | 0 , 0 | 2 |
| A4 RIGHT TOP | A4 RIGHT BOTTOM | 210 , 0 | 3 |
| A4 LEFT BOTTOM | A4 LEFT TOP | 0 , 297 | 3 |
| A4 RIGHT BOTTOM | A4 RIGHT TOP | 210 , 297 | 2 |
| A5 LEFT TOP | A5 LEFT BOTTOM | 0 , 0 | 2 |
| A5 RIGHT TOP | A5 RIGHT BOTTOM | 210 , 0 | 3 |
| A5 LEFT BOTTOM | A5 LEFT TOP | 0 , 149 | 3 |
| A5 RIGHT BOTTOM | A5 RIGHT TOP | 210 , 149 | 2 | of recording sheets and control means for controlling the binding means to select one of the plurality of types of binding members in accordance with the orientation of input image data.

FACSIMILE-LIKE RECORDING APPARATUS WITH OUT-OF-STAPLES OPERATION

BACKGROUND OF THE INVENTION

1. Field of the Invention

This invention relates to a recording apparatus capable of recording an image on a recording medium and having a function of binding a plurality of recording medium sheets on which images are recorded.

2. Description of the Prior Art

Sorting units for use in recording apparatuses which sort sheets of recording paper on which image data of the documents is recorded are known. Such sorting units include non-sorters which have a plurality of bins and in which a complete copy of each multi,page document is placed in some of the bins, and a discharge tray unit in which a tray on which recording sheets are placed is slid with respect to each document. However, a sorter having a plurality of bins is large, requires a large mounting space and is expensive. In the case of a sliding type discharge tray, there is a possibility of a person other than the operator inadvertently touching and moving the tray so that the sorted positions cannot be discriminated, and also the possibility of the result of sorting being disarranged by an environmental cause.

By considering these problems, an apparatus such as the one disclosed in U.S. Pat. No. 4,917,366, has been proposed in which recording sheets discharged from a copying machine are stapled with respect to one document. A facsimile machine such as the one disclosed in Japanese Patent Laid-Open Publication 62-38656 also has been proposed in which received images are recorded on a lengthwise recording sheet, the recording sheet is cut in a length corresponding to one page, and cut recording sheets obtained on communication process are stapled together.

In these proposed apparatuses, however, the same operation is continued even after staples have been used up, so that recording sheets are discharged without being stapled. Sorting with respect to documents cannot be effected if there is no staple. There is also a problem of occurrence of stapling failure if the number of recording sheets in each document to be stapled is increased. Also, while recording sheets can be sorted with respect to documents, it is not possible to discriminate between documents by the content of each document (e.g., recording sheets obtained as confidential reception output, recording sheets assigned to a particular department). Further, since the stapler is mounted in a fixed position, recording sheets may be stapled at an unsuitable position, such that the staple must be manually removed, if the orientation of recorded images is changed.

SUMMARY OF THE INVENTION

An object of the present invention is to provide a recording apparatus free from the above-described problems.

Another object of the present invention is to provide a recording apparatus arranged to facilitate a sorting operation based on binding the recording medium sheets with respect to each document but also facilitating a sorting operation even when there is no binding member.

Yet another object of the present invention is to provide a recording apparatus that selects binding members according to the categories of information to be output so that recording medium sheets can easily be discriminated based on the contents of output information.

A further object of the present invention is to provide a recording apparatus that binds recording sheets at a position selected in accordance with the orientation of images recorded thereon.

In one aspect of the invention, there is provided a recording apparatus comprising recording means for recording images on recording members, binding means for binding with a binding member a plurality of the recording members on which images are recorded by the recording means, detection means for detecting the existence and non-existence of the binding member and control means for controlling the recording and binding means so that, upon detection of the existence of binding members, images are recorded on a plurality of recording members and the plurality of recording members are bound, and upon detection of the non-existence of binding members, the images are recorded on one recording member.

In another aspect of the invention, there is provided a recording apparatus comprising recording means for recording images on a recording sheet, cutting means for cutting the recording sheet on which images are recorded in a direction perpendicular to its lengthwise direction to produce cut sheets, binding means for binding with a binding member a plurality of the cut sheets, detection means for detecting the existence and non-existence of binding members in the binding means and control means for controlling the cutting and binding means so that, upon detection of the existence of binding members, the cutting means cuts the recording sheet by a unit length corresponding to a page and the binding means binds a plurality of cut recording sheets and, upon detection of the non-existence of binding members, the cutting means cuts the recording member by a unit length corresponding to one document.

In yet another aspect of the invention, there is provided a recording apparatus comprising means for receiving input image data, recording means for recording images on recording sheets based on the input image data, binding means for binding with a binding member a plurality of recording sheets on which images are recorded by the recording means, detection means for detecting the existence and non-existence of binding members in the binding means, memory means for storing the input image data and control means for controlling the recording and binding means so that, upon detection of the existence of binding members, images based on the input data are recorded on recording sheets which are thereafter bound, and, upon the detection of the non-existence of binding members, the image data is stored in the memory means.

In still yet another aspect of the invention, there is provided a recording apparatus comprising means for receiving input image data, recording means for recording images on recording sheets based on the input image data, binding means for binding, with a binding member selected from plurality of types of binding members, a plurality of recording sheets on which images are recorded by the recording means and control means for selecting one of the plurality of binding members in accordance with the kind of input image data and for instructing the binding means to bind the recording members with the selected binding member.

In a further aspect of the invention, there is provided a recording apparatus comprising means for receiving input image data, recording means for recording images on recording sheets based on input image data, binding means for binding, with a binding member selected from a plurality of types of binding members, a plurality of recording sheets on which images are recorded by the recording means, count means for counting the number of recording sheets on which images are recorded by the recording means and control means for selecting one of the plurality of types of binding members in accordance with the result of counting of the count means.

In a modification to the above embodiment, there may also be provided a control means for initiating binding by the binding means when a process of recording images corresponding to one document is completed, wherein the control means initiates binding by the binding means if the number of recording sheets counted by the count means reaches a predetermined value before the process of recording images corresponding to one document is completed.

In a further aspect of the invention, there is provided a recording apparatus comprising recording means for recording images on recording sheets, binding means for binding with a binding member a plurality of recording sheets at a selected position on the plurality of recording sheets, designation means for designating a position on the recording sheets at which the recording sheets are bound by the binding means and control means for initiating binding of the recording sheets by the binding means at the designated position thereon when a process of recording images corresponding to one document is completed.

In yet a further variation of the above invention, there are provided designation means for designating an orientation at which the staples are to be stapled into the recording sheets and a control means for initiating stapling of the recording sheets by the stapling means in the designated orientation when the process of recording images corresponding to one document is completed.

These and other objects and features of the present invention will become apparent from the following detailed description of the invention and the accompanying drawings.

BRIEF DESCRIPTION OF THE DRAWINGS

FIG. 17 is a schematic diagram of examples of originals whose images are transmitted in the fourth embodiment;

FIG. 18 is a diagram of an arrangement for controlling the stapling position in accordance with the fourth embodiment;

FIG. 19 is a schematic diagram of the orientation of the staple in accordance with the fourth embodiment;

FIG. 20 is a schematic diagram of the position and orientation of staples with respect to originals in accordance with the fourth embodiment; and FIG. 21 is a table of values of stapler coordinate data and stapler orientation data in accordance with the fourth embodiment.

DESCRIPTION OF THE PREFERRED EMBODIMENTS

Preferred embodiments of the present invention will be described below with reference to the accompanying drawings.

Embodiment 1

Figure 1:
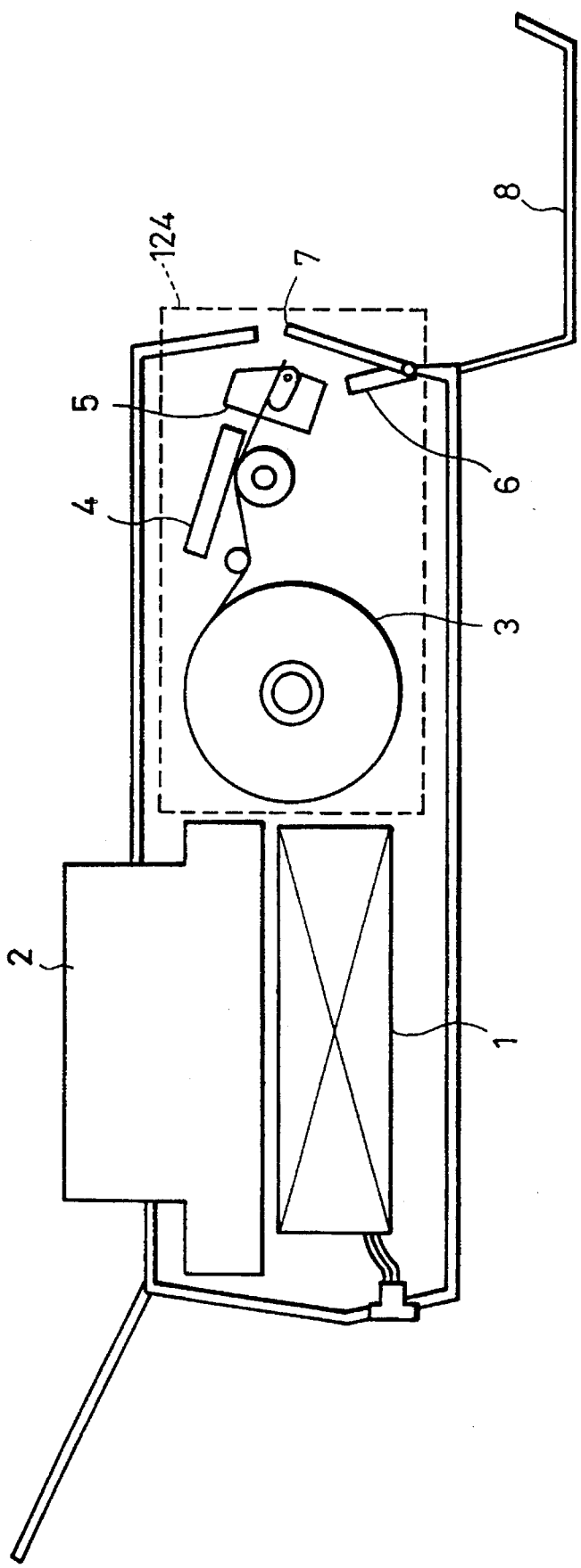
FIG. 1 is a schematic cross-sectional view of a facsimile apparatus in accordance with an embodiment of the present invention.

FIG. 1 is a schematic cross-sectional view of a facsimile machine which represents an embodiment of the present invention. This facsimile machine has an image processing unit 1 for processing an image signal to be transmitted or a received image signal, an image reading unit 2 for reading an image to be transmitted and converting the read image into an electrical signal, and a recording unit 124 for recording a received image signal. A lengthwise rolled sheet of recording paper 3 and a recording head 4 for recording images on the recording paper 3 are provided in the recording unit 124. In this embodiment, the recording head 4 is a thermal head printer. Alternatively, an ink jet head or other applicable printing means may be utilized. In the recording unit 124 are also provided a cutter 5 for cutting the recording paper 3 by a predetermined length, a stapler 6 for stapling a plurality of cut pieces of recording paper 3, and a recording paper retainer 7 for temporarily retaining a batch of stapled pieces of cut recording paper. The facsimile machine further has a recording paper stacker 8 in which sheets of discharged recording paper 3 are stacked. The recording paper retainer 7 retains a batch or a piece of recording paper 3 so that the recording paper 3 hangs down outside the machine, and thereafter recording paper retainer 7 rotates to make the recording paper 3 fall into the recording paper stacker 8.

Figure 2:
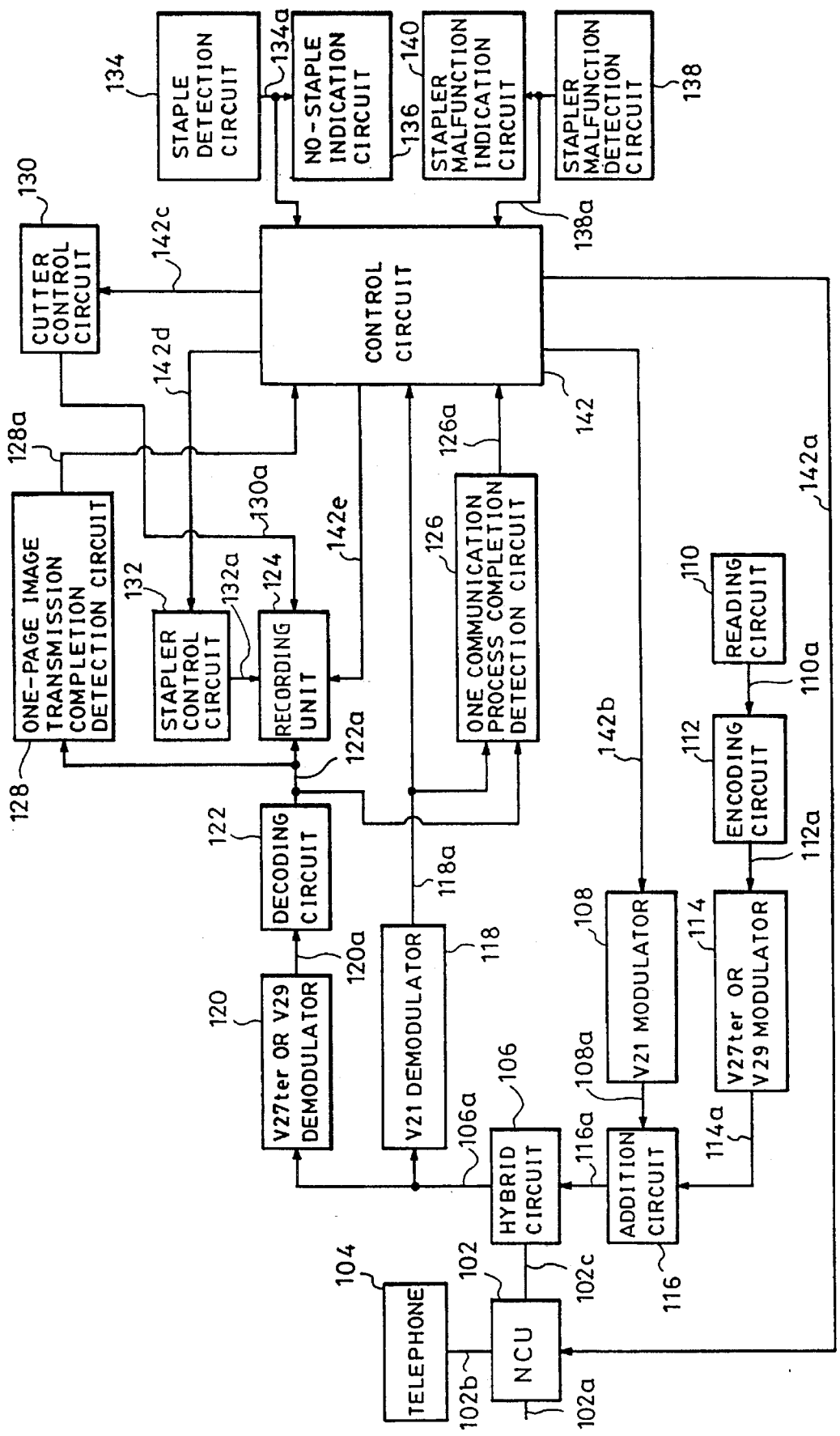
FIG. 2 is a block diagram of signal processing unit 1 in accordance with a first embodiment of the present invention.

FIG. 2 is a block diagram of the signal processing unit 1.

The signal processing unit 1 comprises a network control unit (NCU) 102 which enables a telephone network to be used for data communication or the like. The NCU 102 is connected to a terminal of a communication circuit to effect connection control of a telephone operating network, changeover to a data communication line, maintenance of a loop, and so on.

A signal line 102a is a telephone line through which the NCU 102 inputs a signal to a signal line 142a. If the level of this signal is "0" the NCU 102 turns off its internal CML relay to connect the telephone line to a telephone 104, that is, connect a signal line 102a to signal line 102b. If the level of the signal input to the signal line 142a is "1" the NCU 102 turns on its internal CML relay to connect the telephone line to the facsimile machine, that is, connect the signal line 102a to a signal line 102c. In an ordinary state, the telephone line is connected to the telephone.

A hybrid circuit 106 serves to separate signals on a transmitting system and a receiving system from each other. A signal on a signal line 116a to be transmitted is sent to the telephone line through the hybrid circuit 106, the signal line 102c and the NCU 102. A signal sent from a terminal on the other end of the line is supplied to a signal line 106a through the NCU 102, the signal line 102c and the hybrid circuit 106.

A modulator 108 effects modulation based on the CCITT recommendation Ver.21. The modulator 108 receives a procedure signal through a signal line 142b, modulates this signal and outputs modulated data to a signal line 108a.

Image signals each corresponding to one image line in the main scanning direction are successively read from a transmission original and formed into a binary black-and-white signal train by an image pickup device such as a charge coupled device (CCD) and an optical system. This binary black-and-white signal train is supplied to a signal line 110a through a reading circuit 110.

An encoding circuit 112 receives the read data from the signal line 110a, encodes this data into MH(modified Huffman)-encoded data or MR(modified reed)-encoded data and outputs this data to a signal line 112a.

A modulator 114 effects modulation based on the CCITT recommendation Ver.27 Ter. (differential phase modulation) or Ver.29 (orthogonal modulation). The modulator 114 receives the encoded signal from the signal line 112a, modulates this signal and outputs modulated data to a signal line 114a.

An addition circuit 116 receives the signals from the signal line 108a and the signal line 114a, adds these signals and outputs the result of this addition to a signal line 116a.

A demodulator 118 effects demodulation based on the CCITT recommendation Ver.21. The demodulator 118 receives the signal from the signal line 106a, demodulates this signal and outputs demodulated data to a signal line 118a.

A demodulator 120 effects demodulation based on the CCITT recommendation Ver.27 Ter. (differential phase modulation) or Ver.29 (orthogonal modulation). The demodulator 120 receives the signal from the signal line 106a, modulates this signal and outputs modulated data to a signal line 122a.

A decoding circuit 122 receives the signal from the signal line 120a, decodes this signal into MH(modified Huffman)-decoded data or MR(modified reed)-decoded data and outputs this data to a signal line 122a.

The recording unit 124 receives the decoded data output to the signal line 122a and operates to successively record lines of an image in accordance with the black-and-white signal. The recording unit 124 has, as described above, recording paper 3, recording head 4, cutter 5, stapler 6, recording paper retainer 7 and recording paper stacker 8. The cutter 5 cuts the recording paper according to a cutter control signal on a signal line 130a, and the stapler 6 staples pieces of recording paper according to a stapler control signal on a signal line 132a. The recording paper retainer 7 in the recording unit 124 makes the retained recording paper fall into the recording paper stacker 8 according to recording paper fall instruction pulses on a signal line 142e.

A communication termination detection circuit 126 receives the decoded data output to the signal line 122a and the procedure signal output to the signal line 118a to detect completion of one communication process. The communication termination detection circuit 126 outputs pulses to a signal line 126a when it detects completion of one communication process. The communication termination detection circuit 126 determines that one communication process has been completed when it detects an end-of-procedure (EOP) signal subsequent to a return-to-control (RTC) signal.

A one-page image transmission completion detection circuit 128 receives the decoded data output to the signal line 122a to detect completion of the process of receiving a one-page image, and generates pulses on a signal line 128a when it detects completion of the process of receiving a one-page image. The circuit 128 determines that one-page image receiving is completed, when it detects the RTC signal.

A stapler control circuit 132 controls the stapler 6 in the recording unit 124, and a cutter control circuit 130 controls the cutter 5 in the recording unit 124.

A staple detection circuit 134 detects whether staples to be used for next stapling are left in the stapler 6. The staple detection circuit 134 outputs a signal having a level "1" to a signal line 134a if some staples are left and outputs a signal having a level "0" if no staple is left.

A no-staple indication circuit 136 receives the signal from the signal line 134a, and displays "No staple" when the signal level is "0" and does not display any message when the level of the signal on the signal line 134a is "1".

A stapler malfunction detection circuit 138 detects whether or not the stapler 6 malfunctions, and outputs a signal having level "1" to a signal line 138a if the stapler 6 malfunctions, or outputs a signal having level "0" while the stapler 6 is in the normal state.

A stapler malfunction indication circuit 140 operates to indicate a malfunctioning state of the stapler 6. It receives the signal from the signal line 138a, and displays "Stapler needs repairing" when the signal level is "1" or does not display when the level of the signal on the signal line 138a is "0".

A control circuit 142 carries out a control process described below.

Figure 3:
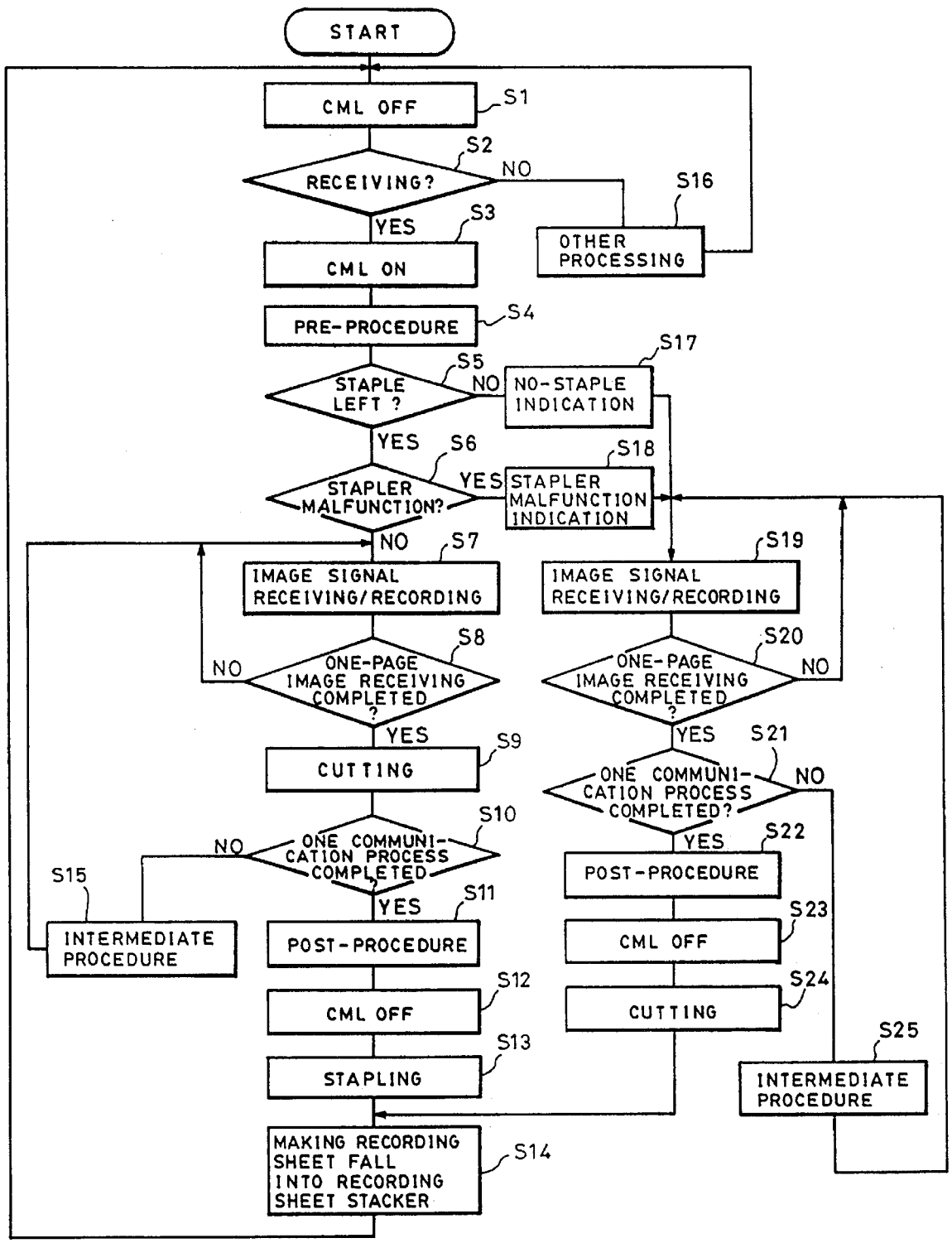
FIG. 3 is a flowchart of control of control circuit 142 of the first embodiment.

FIG. 3 is a flowchart of the control process performed by the control circuit 142. First, signal "0" is output to the signal line 142a to turn off the CML relay in the NCU 102, so that the telephone line 102a is connected to the telephone 104 (step S1). If a call signal is received through the telephone line 102a from the terminal on the other end of the line (step S2), the CML relay in the NCU 102 is turned on to connect the telephone line 102a to the facsimile machine, i.e., the signal line 102c (step S3). The necessary signal exchange with the transmitting terminal (pre-procedure) is effected to receive image signals from the transmitting terminal (step S4). If the existence of staples is detected by the staple detection circuit 134 (step S5) and no malfunction of the stapler 6 is detected by the malfunction detection circuit 138 (step S6), image signals are received and corresponding images recorded on recording paper 3 (step S7). Recording paper 3 is then cut with respect to pages (steps S8, S9), and cut pieces of recording paper 3 are retained by the recording paper retainer 7. A determination is then made to ascertain whether one communication process is completed (step S10), and, if not, necessary signal exchange with the transmitting terminal (intermediate procedure) is effected to receive the next image signals (step S15), and the process returns to step S7. However, if it is determined in step S10 that one communication process has been completed, signal exchange (post-procedure) for terminating image signal receiving is effected (step S11), and the CML relay in the NCU 102 is turned off to connect the telephone line 102a to the telephone 104, i.e., the signal line 102b (step S12). Then, pieces of recording paper 3 cut with respect to pages of the record provided by the one communication process and retained by the recording sheet retainer 7 are stapled by the stapler 6 (step S13). Recording paper fall instruction pulses are output to the signal line 142e to rotate the recording paper retainer 7, whereby the pieces of recording paper 3 stapled by the stapler 6 are made to fall into the recording paper stacker 8 (step S14). The process then returns to step S1 to wait for another reception.

If it is determined in step S5 that no staples are left, a display is made by the no-staple indication circuit 136 to indicate that there are no staples (step S17). If it is determined in step S6 that stapler 6 has malfunctioned, stapler malfunction indication circuit 140 causes a display to indicate that the stapler 6 has malfunctioned (step S18). If no staples are left or the stapler 6 has malfunctioned, image signals are received and corresponding images recorded without performing cutting with respect to pages (step S19). A determination is then made whether one communication process has been completed when one-page image is completely received (steps S20, S21) and, if not, necessary signal exchange with the transmitting terminal (intermediate procedure) is effected to receive the next image signals (step S25), and the process proceeds to step S19. If it is determined in step S21 that one communication process is completed, signal exchange (post-procedure) for terminating image signal receiving is effected (step S22) and the CML relay in the NCU 102 is turned off to connect the telephone line 102a to the telephone 104, i.e., the signal line 102b (step S23). Then, pieces of recording paper 3 are cut by a unit length for one communication process (step S24) and are discharged by being made to fall into the recording paper stacker 8 (step S14). The process then returns to step S1.

As described above, when stapler 6 is in a normal state and has some staples left, a lengthwise recording paper 3 is cut by a length corresponding to each page and cut pieces of recording paper 3 are stapled together with respect to each communication process. When stapler 6 malfunctions or no staple is left, recording paper 3 is cut after images have been recorded by one communication process without being cut with respect to each page. It is therefore possible to group discharged pieces of recording paper with respect to single communication processes irrespective of whether or not the pieces of recording paper can be stapled.

A selection switch may be provided to manually select the procedure of cutting the recording paper page by page and stapling cut pieces of recording paper with respect to each communication process or the procedure of cutting the recording paper by a length for each communication process.

In the case of an arrangement wherein images are recorded on cut sheets of recording paper, all received image pages may be recorded on one cut sheet by being reduced.

The present invention can also be applied to copying machines, printers, electronic filing apparatuses which, for example, read images and electronically store the read image in a storage medium.

Embodiment 2

Figure 4:
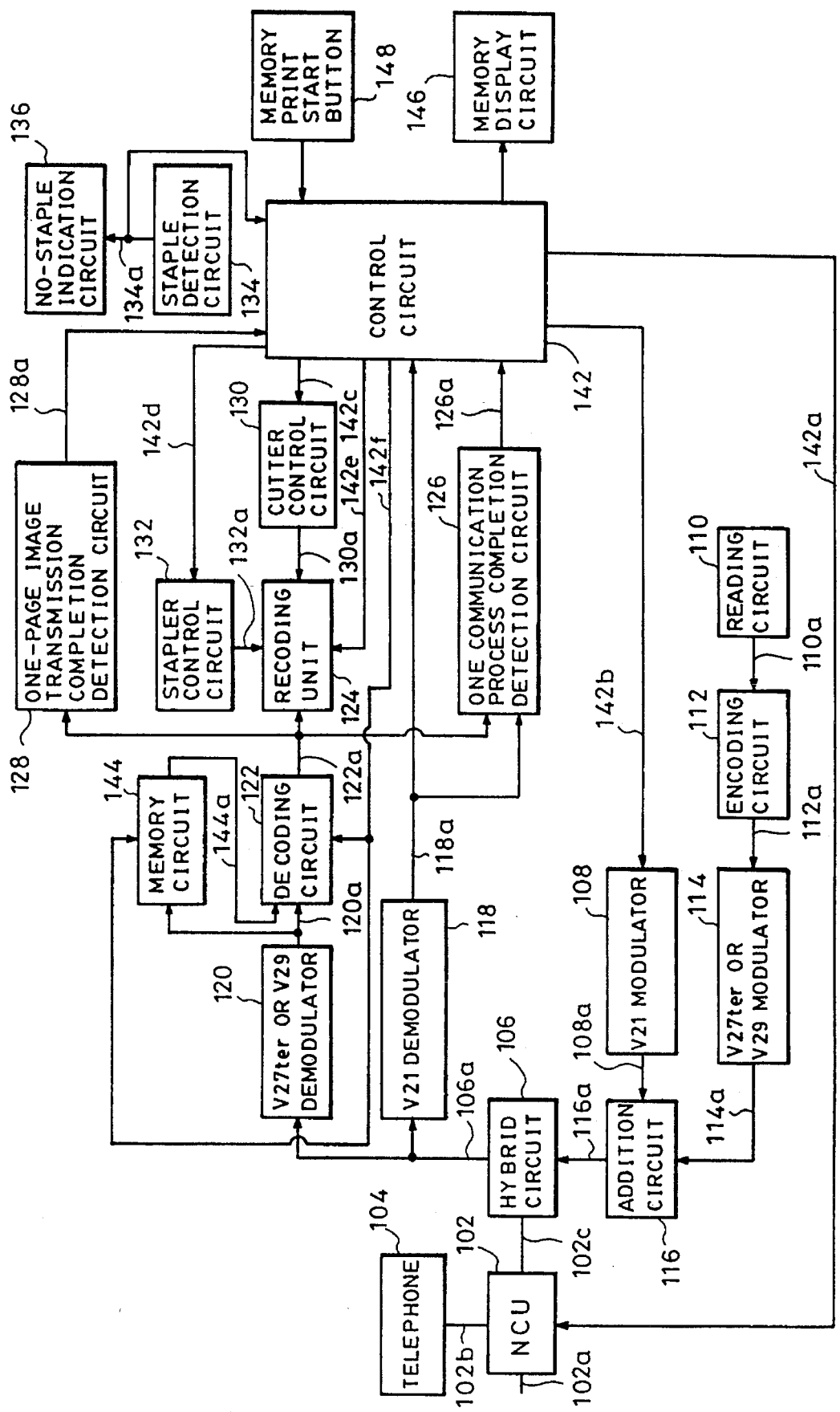
FIG. 4 is a block diagram of signal processing unit 1 in accordance with a second embodiment of the present invention.

A second embodiment of the present invention will be described below. A facsimile machine in accordance with this embodiment has the same construction as that schematically shown in FIG. 1 in section. FIG. 4 is a block diagram of a signal processing unit 1 in accordance with this embodiment. Components 102 to 142 are the same as those shown in FIG. 2 and the description for them will not be repeated. A block 144 represents a memory circuit for storing received image data. The memory circuit 144 does not operate when a signal "0" or a signal "1" is output to a signal line 142f. The memory circuit 144 stores received data supplied through the signal line 120a when a signal "2" is output, and outputs data stored in it to a signal line 144a when a signal "3" is output. A block 146 represents a memory display circuit for indicating that received data is stored in the memory circuit 144, and a block 148 represents a memory print start button for starting printing images of received data stored in the memory circuit 144.

Figure 5:
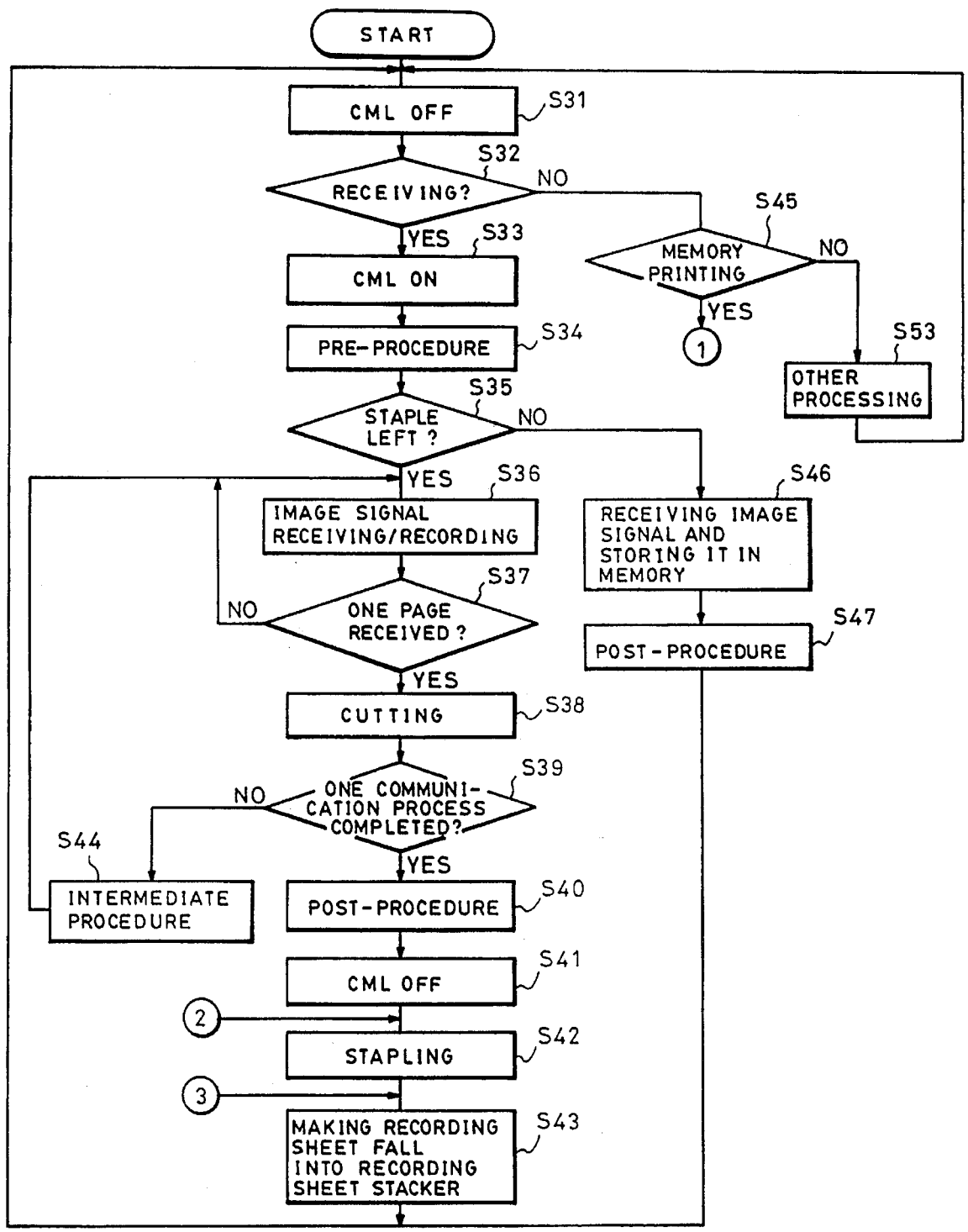
FIG. 5 is a flowchart of control of control circuit 142 of the second embodiment.
Figure 6:
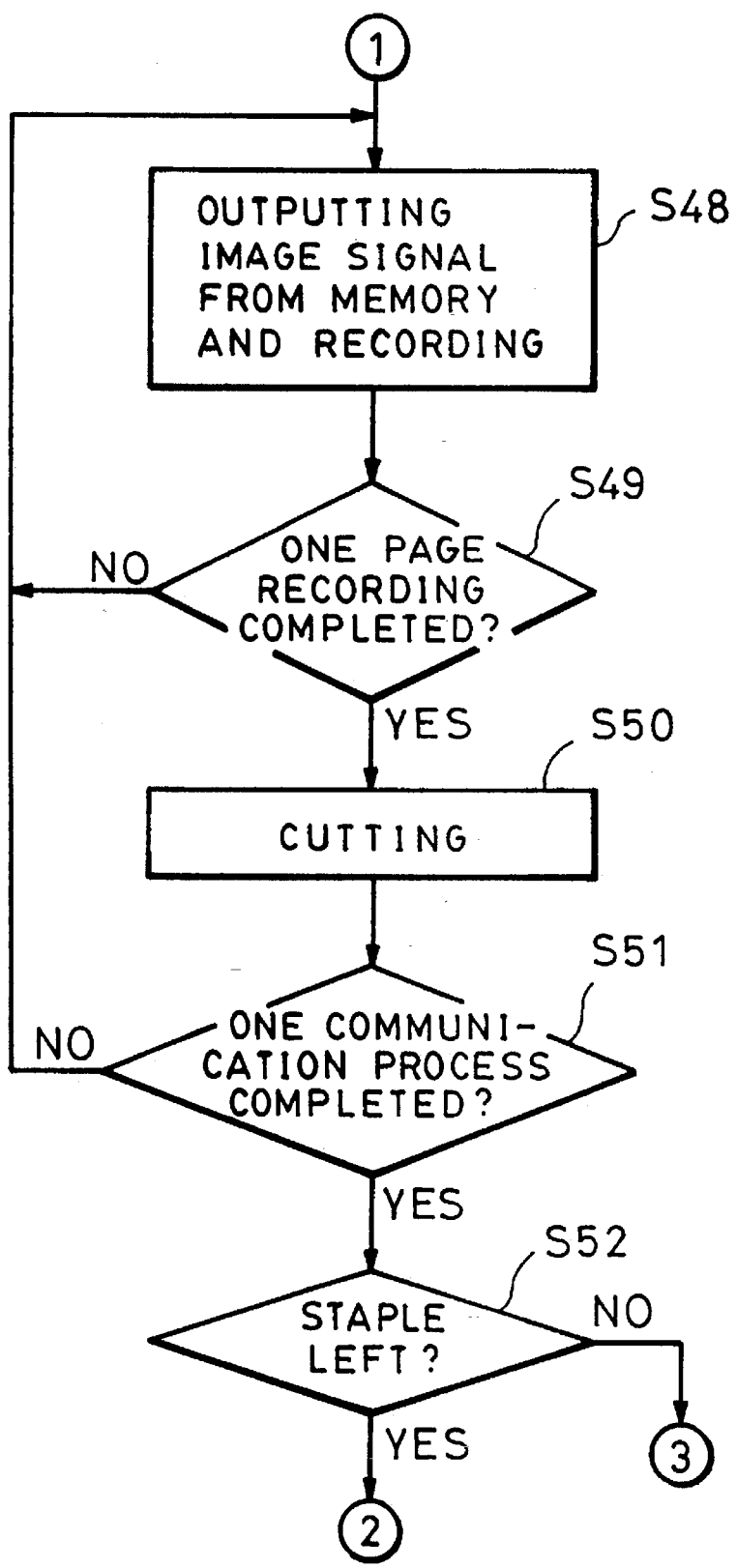
FIG. 6 is another flowchart of control of control circuit 142 of the second embodiment.

A control process for the control circuit of this embodiment will be described below with reference to FIGS. 5 and 6.

First, signal "0" is output to the signal line 142a to turn off the CML relay in the NCU 102, so that the telephone line 102a is connected to the telephone 104 (step S31). If a call signal is received through the telephone line 102a from the terminal on the other end of the line (step S32), the CML relay in the NCU 102 is turned on to connect the telephone line 102a to the facsimile machine, i.e., thru signal line 102c (step S33), and necessary signal exchange with the transmitting terminal (pre-procedure) is effected to receive image signals from the transmitting terminal (step S34). If the existence of some staples has been detected by the staple detection circuit 134 (step S35), image signals are received to record corresponding images on recording paper 3 (step S36), recording paper 3 is cut with respect to pages (steps S37, S38), and cut pieces of recording paper 3 are retained by the recording paper retainer 7. If at this time one communication process is not completed (step S39), necessary signal exchange with the transmitting terminal (intermediate procedure) is effected to receive the next image signals (step S44), and the process returns to step S36. If it is determined in step S39 that one communication process is completed, signal exchange (post-procedure) for terminating image signal receiving is effected (step S40), the CML relay in the NCU 102 is turned off to connect the telephone line 102a to the telephone 104, i.e., the signal line 102b (step S41). Then, pieces of recording paper 3 cut with respect to pages of the record provided by the one communication process and retained by the recording sheet retainer 7 are stapled by the stapler 6 (step S42), and recording paper fall instruction pulses are output to the signal line 142e to rotate the recording paper retainer 7. The batch of the pieces of recording paper 3 stapled by the stapler 6 is thereby made to fall into the recording paper stacker 8 (step S43). The process then returns to step S31 to wait for another reception.

If it is determined in step S35 that no staples are left, a display is activated by the no-staple indication circuit 136 to indicate that there is no staple and signal "2" is generated on the signal line 142f, so that received image data obtained by one communication process is stored in the memory circuit 144 (step S46). A display is then made by the memory display circuit 146 to indicate that received image data has been stored, and signal exchange (post-procedure) for terminating image signal receiving is effected (step S47). The process then returns to step S31.

If in step S32 no call signal is received from the other end terminal, some processing other than receiving is performed. However, if the memory print start button 148 is pressed (step S45), printing using received image data stored in the memory circuit 144 is started. Signal "3" is output to the signal line 142f to make the memory circuit 144 output the stored received image data to the recording unit 124 and to make the recording unit 124 perform printing (step S48). When recording of one page is completed (step S39), recording paper 3 is cut by the cutter 5 (step S50) and cut pieces of recording paper 3 are retained by the recording paper retainer 7. If at this time recording of received image data obtained by one communication process is completed (S51) and if the existence of some staples is detected by the staple detection circuit 134 (S52), the pieces of recording paper 3 cut with respect to pages of the record provided by the one communication process and retained by the recording sheet retainer 7 are stapled by the stapler 6 (step S42) and made to fall into the recording paper stacker 8 (step S43). The process then returns to step S31.

If the staple detection circuit 134 determines in step S52 that no staples are left, a display is made by the no staple indication circuit 136 to indicate that there is no staple, and recording paper 3 is made to fall into the recording paper stacker 8 without being cut with respect to pages and stapled (step S43). The process then returns to step S31.

As described above, if some staples are left when image data is received, recording paper 3 on which received image data is recorded is cut by a length corresponding to each page and cut pieces of recording paper 3 are stapled together with respect to each communication process or, if no staple is left at the time of receiving, the received image data is stored in the memory circuit 144 and printing of the received image data stored in the memory circuit 144 is performed when the memory start button 148 is pressed. No print is formed and discharged until the memory print start button 148 is pressed if there is no staple. It is therefore possible for the user to print the record after replenishing staples or to observe the recording paper 3 on which images are recorded until the printing operation is finished, so that discharged sheets of recording paper can be grouped with respect to communication processes.

Printing of received image data stored in the memory circuit 144 may be started when the staple detection circuit 134 detects the existence of staples.

Although this embodiment has been described as a facsimile machine, the present invention can also be applied to a copying machine having a stapler, a printer having a stapler or the like.

The arrangement may alternatively be such that recording sheets are bound with a paper clip or other binding means instead of a staple.

As described above, if there is no binding member for binding a plurality of recording sheets with respect to each of the documents to be recorded thereon, the documents are recorded on one recording member, so that the documents can easily be sorted even if all binding members have been used up.

Also, if there is no binding member for binding a plurality of recording sheets with respect to each of documents which are input as image data to be recorded thereon as images, the input image data is stored by a memory means. It is thereby possible to prevent occurrence of a situation where the plurality of recording sheets are separated from each other and cannot be sorted easily, even if there is no binding member.

The present invention can also be applied to any arrangement other than that of the above-described embodiment, as long as a lengthwise sheet can be cut and a plurality of sheets cut from the lengthwise sheet can be bound together.

The present invention can also be applied to copying machines, printers, electronic filing apparatuses and the like.

Embodiment 3

Figure 7:
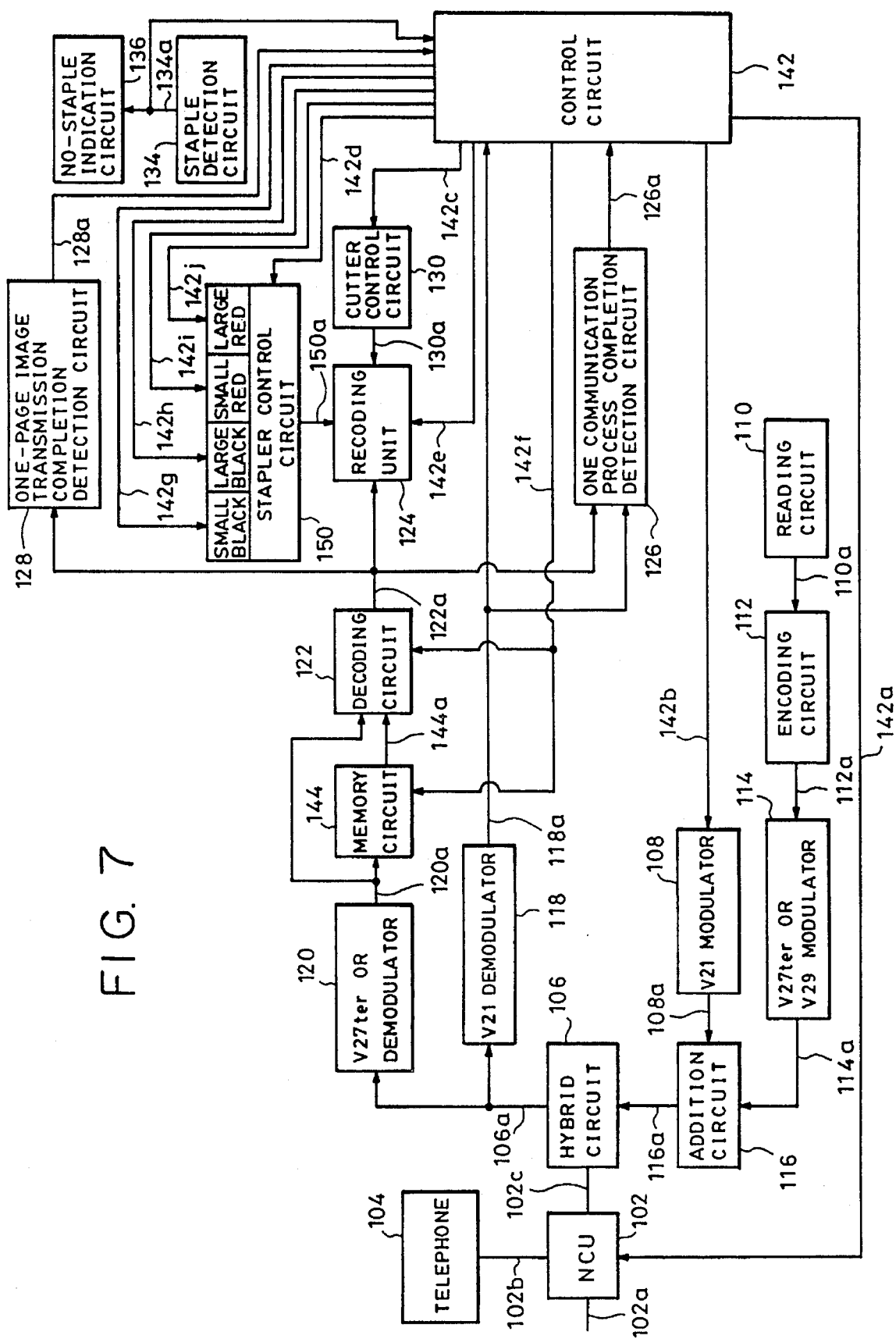
FIG. 7 is a block diagram of signal processing unit 1 in accordance with a third embodiment of the present invention.
Figure 8:
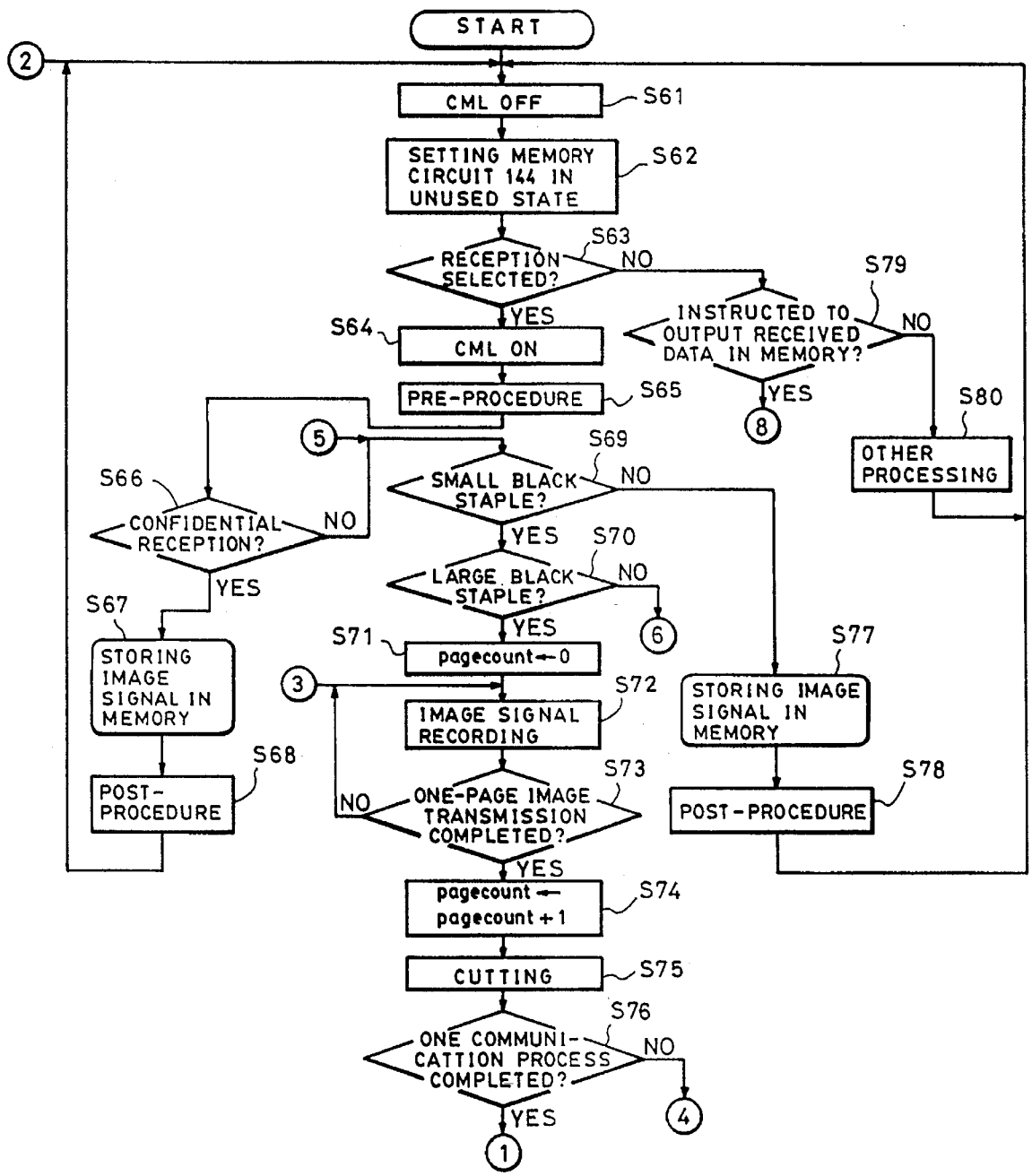
FIG. 8 is a flowchart of control of control circuit 142 of the third embodiment.
Figure 9:
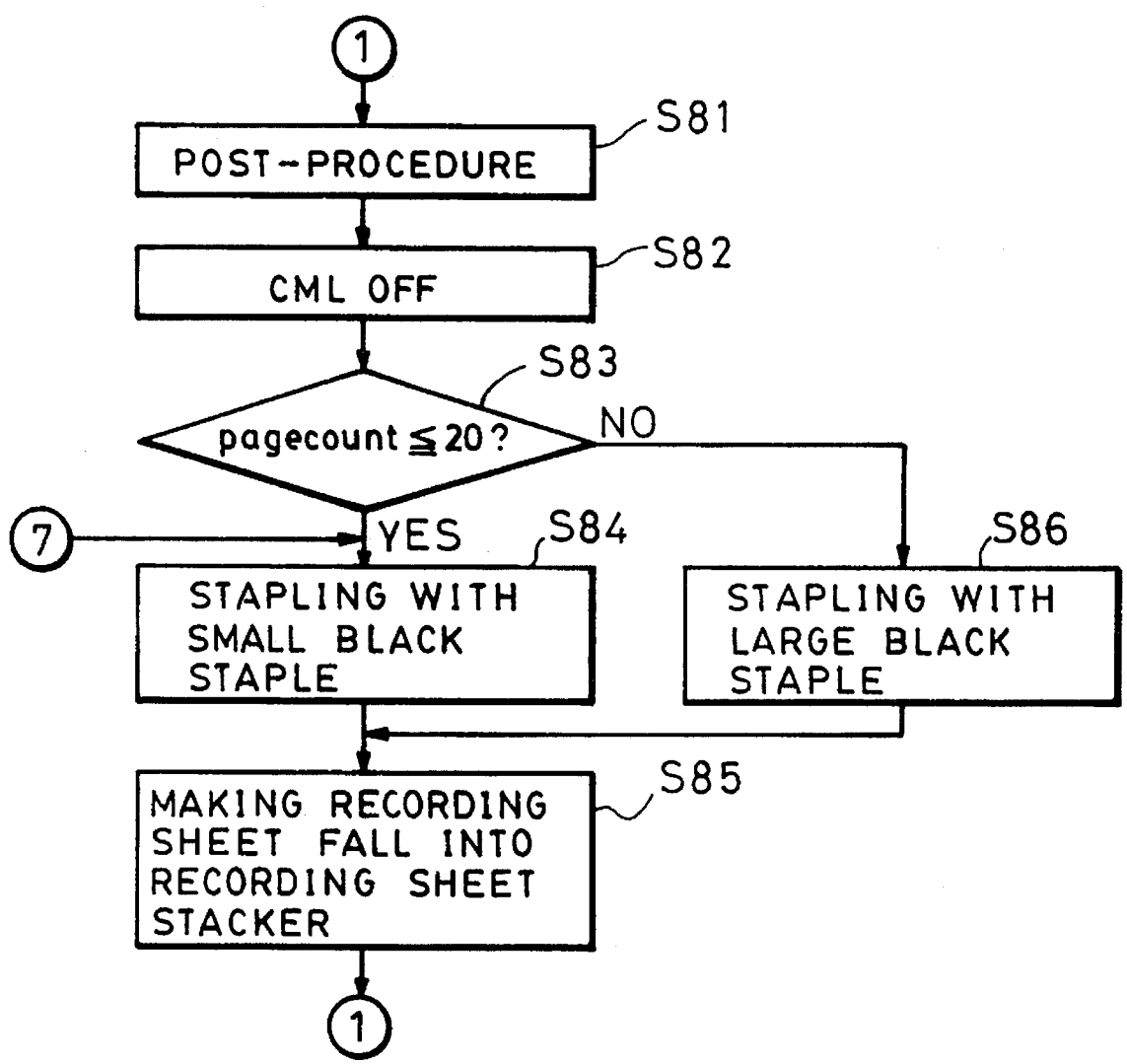
FIGS. 9 to 13 are other flowcharts of control circuit 142 of the third embodiment.

A third embodiment of the present invention will be described below. A facsimile machine in accordance with this embodiment has a construction such as that schematically shown in FIG. 1. FIG. 7 is a block diagram of a signal processing unit 1 in accordance with this embodiment. Components 102 to 142 are the same as those shown in FIGS. 2 and 4 and the description for them will not be repeated.

A block 150 represents a stapler control circuit which makes the stapler 6 perform a stapling operation when stapling instruction pulses are generated on a signal line 142d. When a signal having level "1" is output to a signal line 142g while a signal having level "0" is output to signal lines 142h, 142i and 142j, a small black staple is used. When a signal having level "1" is output to the signal line 142h while a signal having level "0" is output to signal lines 142g, 142i, and 142j, a large black staple is used. When a signal having level "1" is output to the signal line 142i while a signal having level "0" is output to signal lines 142g, 142h, and 142j, a small red staple is used. When a signal having level "1" is output to the signal line 142j while a signal having level "0" is output to signal lines 142g, 142h, and 142i, a large red staple is used. Staple detection circuit 134 detects whether any staple is left, and outputs a signal having level "1" to signal line 134a if some staples are left, or outputs a signal having level "0" if no staples are left. Staple detection circuit 134 outputs to signal line 134a sequence of information, i.e., information on the existence/non-existence of small black staples, information on the existence/non-existence of large black staples, information on the existence/non-existence of small red staples, and information on the existence/non-existence of large red staples to signal line 134a.

No-staple indication circuit 136 receives signals from the signal line 134a and displays "No small black staple" when signal "0111" is output, "No large black staple" when signal "1011" is output, "No small red staple" when signal "1101" is output, and "No large red staple" when signal "1110) is output. The no-staple indication circuit 136 makes no display when the signal on signal line 134a has a level "1111". If two or more of the above four bits are "0", "0" bit outputs indicate non-existence of the corresponding staples.

A control process for the control circuit 142 in the arrangement shown in FIG. 7 will be described below with reference to the flowcharts of FIGS. 8 to 13.

First, signal "0" is output to signal line 142a to turn off the CML relay in NCU 102, so that telephone line 102a is connected to telephone 104 (step S61). Signal "0" is then output to signal line 142f to inhibit use of memory circuit 144 (step S62), and determination is made as to whether or not receiving is selected (step S63). If Yes, the process proceeds to step S64 or, if No, the process proceeds to step S79.

If a No determination is made in step S63, a determination is then made as to whether there is an instruction to output information stored in memory circuit 144 (step S79). If there is an output instruction, the process proceeds to step S98 or, if there is no output instruction, the process proceeds to step S80 to conduct some other processing.

In step S64, a signal having level "1" is output to signal line 142a to turn on the CML relay, so that telephone line 102a is connected to the facsimile machine, i.e., signal line 102c. Pre-procedure processing is then executed in step S65 and a determination is made in step S66 as to whether or not the reception is a confidential reception. If Yes, the process proceeds to step S67 or, if No, the process proceeds to step S69. In step S67, image signals are stored in memory circuit 144 in a confidential reception manner. More specifically, signal "2" is output to signal line 142f and memory circuit 144 is supplied with information output to signal line 120a, while encoding circuit 122 does not operate. After the confidential reception, a display is made to indicate that the confidential reception has been effected. Post-procedure processing is then executed in step S68 and the process returns to step S61.

If No in step S66, the signal from signal line 134a is input and determination is made as to whether there is any small black staple (step 69). If No, reception of image signals to memory circuit 144 is effected. More specifically, signal "2" is output to signal line 142f and memory circuit 144 is supplied with information output to signal line 120a, while decoding circuit 122 does not operate. After the completion of the memory reception, a display is made to indicate that the memory reception has been completed (step S77). Post-procedure processing is then executed in step S78 and the process returns to step S61.

If Yes in step S69, determination is made as to whether there is any large black staple (step S70). If No, the process proceeds to step S86 and subsequent steps or, if Yes, a count value "pagecount" of a page counter for counting the number of pages for stapling is cleared (step S71). Thereafter, image signal receiving/recording is performed (step S72). More specifically, signal "1" is output to recording line 142f and decoding circuit 122 is supplied with the signal from signal line 120a to perform decoding, while memory circuit 144 does not operate.

Next, the signal from signal line 128a is input and a determination is made as to whether transmission of one-page image is completed (step S73). If No, the process returns to step S72 or, if Yes, the count value "pagecount" of the page counter is incremented by 1 (step S74). Then, cutting instruction pulses are generated on signal line 142c to perform cutting (step S75). Then, the signal from signal line 126a is input and a determination is made as to whether one communication process is completed (step S76). If Yes, the process proceeds to step S81 shown in FIG. 9 or, if No, the process proceeds to step S147 and subsequent steps shown in FIG. 13.

In step S81, post-procedure processing is executed and a signal having level "0" is output to signal line 142a to turn off the CML (step S82). Determination is then made as to whether the count value "pagecount" of the page counter is equal to or smaller than 20 (step S83). If No, a signal having level "1" is output to signal line 142f and stapling instruction pulses are thereafter generated on signal line 142d. Pieces of recording paper retained by recording paper retainer 7 are thereby stapled with a large black staple (step S86), and the process proceeds to step S85.

If in step S83 pagecount is equal to or smaller than 20, a signal having level "1" is output to signal line 142g and stapling instruction pulses are thereafter generated on signal line 142d. Pieces of recording paper retained by recording paper retainer 7 are thereby stapled with a small black staple (step S84), and a signal having level "0" is then output to signal line 142g. Then, recording paper fall pulses are generated on signal line 142e to make the recording paper retained by recording paper retainer 7 fall into recording paper stacker 8 (step S85), and the process returns to step S81.

Figure 13:
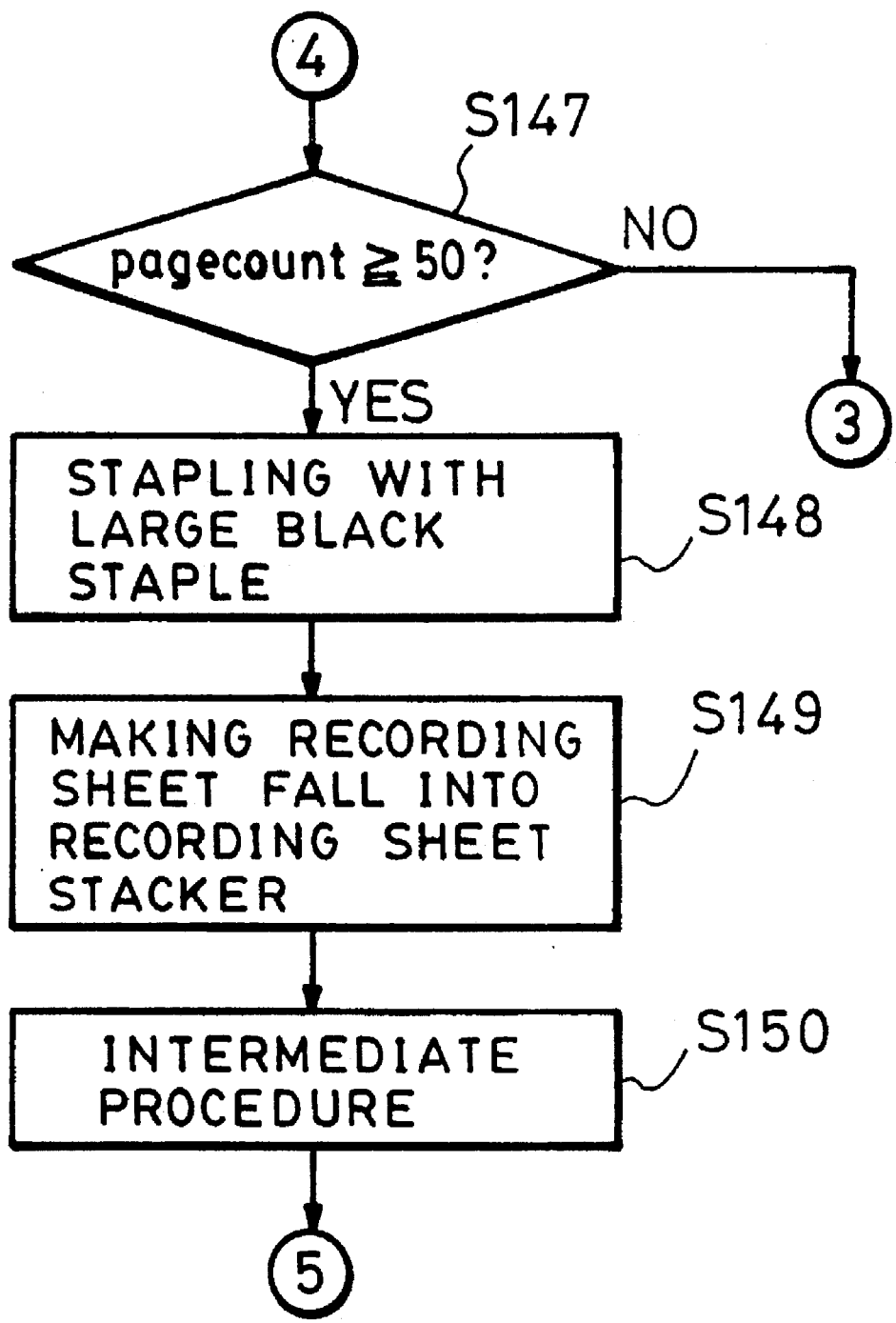

If No in step S76, the process proceeds to step S147 shown in FIG. 13 to determine whether the count value "pagecount" of the page counter is equal to or greater than 50. If No, the process returns to step S72 in FIG. 8 or, if Yes, a signal having level "1" is output to signal line 142h and stapling instruction pulses are thereafter generated on signal line 142d. Pieces of recording paper retained by recording paper retainer 7 are thereby stapled with a large black staple (step S148). Then, recording paper fall pulses are generated on signal line 142j to make the recording paper retained by recording paper retainer 7 fall into recording paper stacker 8 (step S149), intermediate procedure processing is executed (step S150), and the process returns to step S69.

Figure 10:
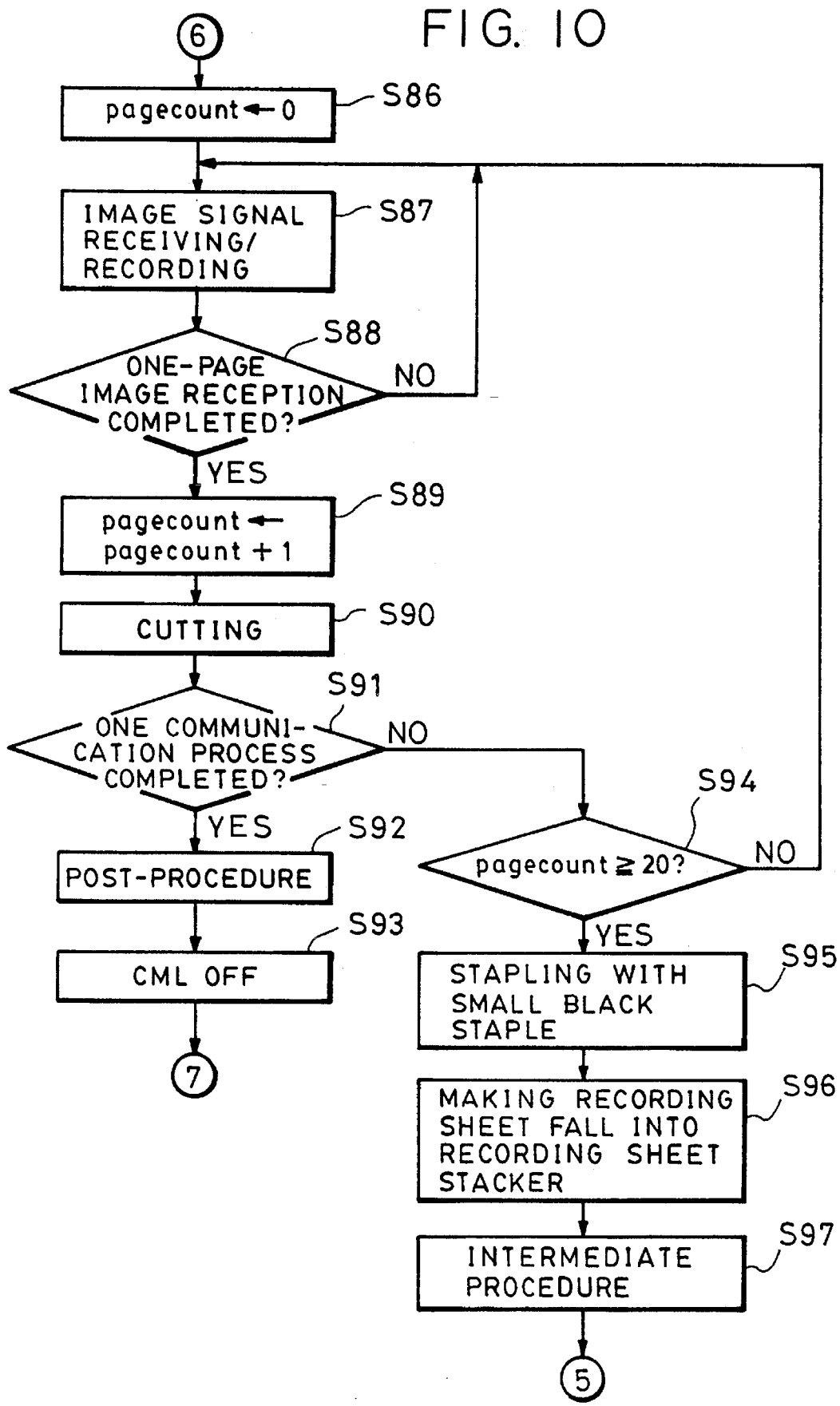

If No in step S70, the process proceeds to step S86 in FIG. 10 where the count value "pagecount" of the page counter is cleared (step S86) and image signal receiving/recording is performed (step S87). More specifically, signal "1" is output to signal line 142f and decoding circuit 122 is supplied with the signal from signal line 120a to perform decoding, while memory circuit 144 does not operate. Subsequently, the signal from signal line 128a is input and determination is made as to whether transmission of one-page image is completed (step S88). If No, the process returns to step S87 or, if Yes, the count value "pagecount" of the page counter is incremented by 1 (step S89) and cutting instruction pulses are generated on signal line 142c to perform cutting (step S90). Then, the signal from signal line 126a is input and determination is made as to whether one communication process is completed (step S91). If Yes, post-procedure processing is executed (step S92), a signal having level "0" is output to signal line 142a to turn off the CML (step S93), and the process returns to step S84 in FIG. 7.

If No in step S91, determination is made as to whether the count value "pagecount" of the page counter is equal to or greater than 20 (step S94). If No, the process returns to step S87 or, if Yes, pieces of recording paper retained by recording paper retainer 7 are stapled with a small black staple (step S95). Then, recording paper fall pulses are generated on signal line 142e to make the recording paper retained by recording paper retainer 7 fall into recording paper stacker 8 (step S96), and intermediate procedure processing is executed (step S97). The process thereafter returns to step S69.

Figure 11:
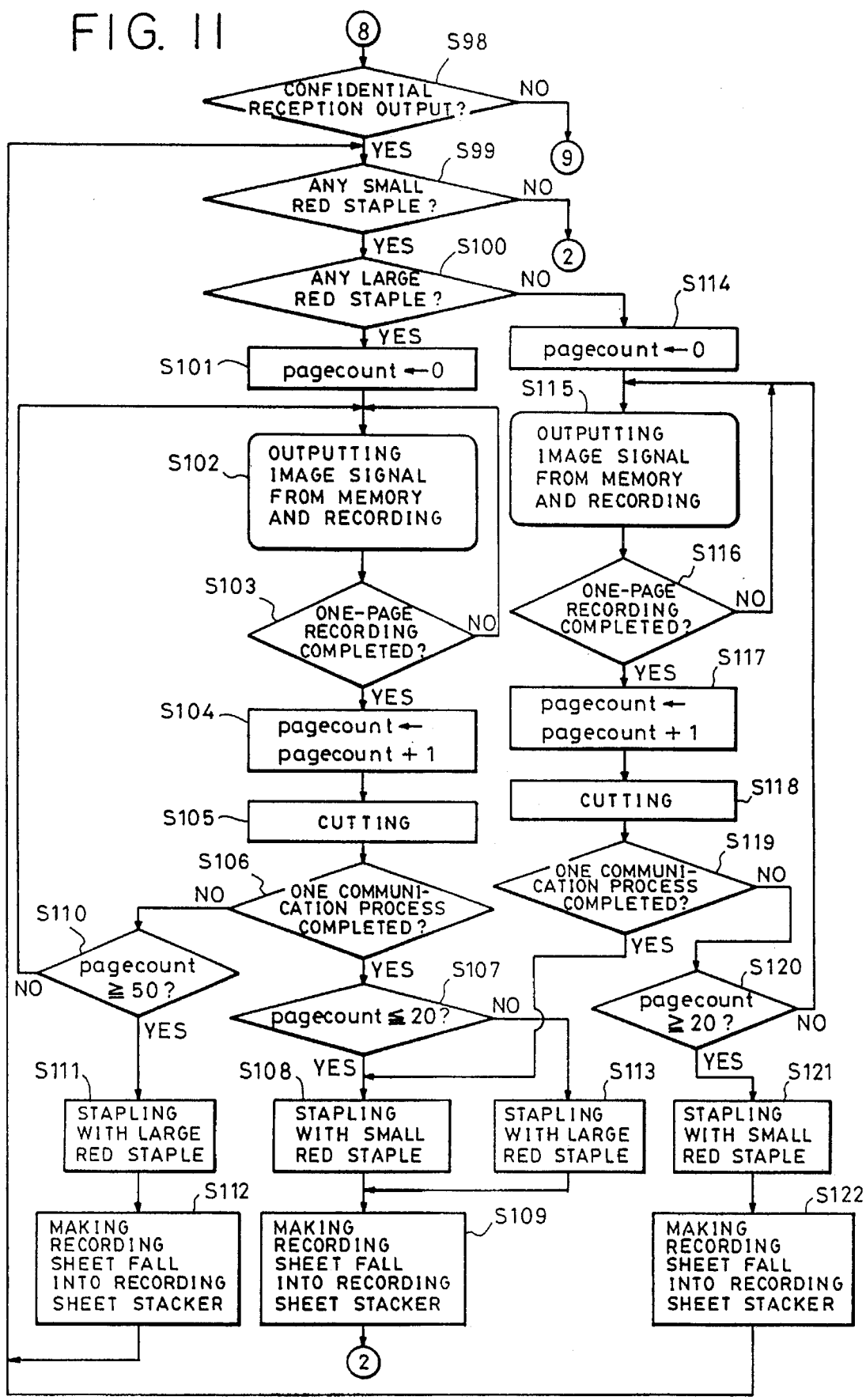

If Yes in step S79, the control process proceeds to step S98 shown in FIG. 11 to determine whether the recording output is one of confidential reception. If No, the process proceeds to step S123 and subsequent steps shown in FIG. 12. If Yes, the signal from signal line 134a is input and determination is made as to whether there is any small red staple (step S99). If No, the process returns to step S61 in FIG. 8 or, if Yes, determination is made as to whether there is any large red staple (step S100). If Yes, the count value "pagecount" of the page counter for counting the number of pages for stapling is cleared (step S101) and information stored in memory circuit 144 is output and recorded (step S102). More specifically, signal "3" is output to signal line 142f, memory circuit 144 outputs the stored data to signal line 144a, and decoding circuit 122 receives and decodes the information output to the signal line 144a.

Then, determination is made as to whether recording of one page is completed (step S103). If No, the process returns to step S102 or, if Yes, the count value "pagecount" of the page counter is incremented by 1 (step S104) and cutting instruction pulses are generated on signal line 142c to perform cutting (step S105). Next, determination is made as to whether recording of one communication process is completed (step S106). If No, determination is made as to whether the count value "pagecount" of the page counter is equal to or greater than 50 (step S110). If No, the process returns to step S102 or, if Yes, a signal having level "1" is output to signal line 142*j* and stapling instruction pulses are thereafter generated on signal line 142*d*. Pieces of recording paper retained by recording paper retainer 7 are thereby stapled with a large red staple (step S111), and a signal having level "0" is output to signal line 142*j*. Subsequently, recording paper fall pulses are generated on signal line 142*e* to make the recording paper retained by recording paper retainer 7 fall into recording paper stacker 8 (step S112), and the process returns to step S99.

If Yes in step S106, a determination is made as to whether the count value "pagecount" of the page counter is equal to or smaller than 20 (step S107). If Yes, a signal having level "1" is output to signal line 142*i* and stapling instruction pulses are thereafter generated on signal line 142*d*. Pieces of recording paper retained by recording paper retainer 7 are thereby stapled with a small red staple (step S108), and a signal having level "0" is output to signal line 142*i*. Then, recording paper fall pulses are generated on signal line !42*e* to make the recording paper retained by recording paper retainer 7 fall into recording paper stacker 8 (step S109), and the process returns to step S61 in FIG. 8.

If No in step S107, pieces of recording paper retained by recording paper retainer 7 are stapled with a large red staple (step S113), and the process returns to step S109.

If No in step S100, the count value "pagecount" of the page counter is cleared (step S114) and information stored in memory circuit 144 is output and recorded (step S114). More specifically, signal "3" is output to signal line 142*f*, memory circuit 144 outputs the stored data to signal line 144*a*, and decoding circuit 122 receives and decodes the information output to the signal line 144*a*.

Then, determination is made as to whether recording of one page is completed (S116). If No, the process returns to step S115 or, if Yes, the count value "pagecount" of the page counter is incremented by 1 (step S117) and cutting instruction pulses are generated on signal line 142*c* to perform cutting (step S118). Next, determination is made as to whether recording of one communication process is completed (step S119). If Yes, the process returns to step S108 or, if No, determination is made as to whether the count value "pagecount" of the page counter is equal to or greater than 20 (step S120). If No, the process returns to step S115 or, if Yes, pieces of recording paper retained by recording paper retainer 7 are stapled with a small red staple (step S121). Subsequently, recording paper fall pulses are generated on signal line 142*e* to make the recording paper retained by recording paper retainer 7 fall into recording paper stacker 8 (step S122), and the process returns to step S99.

Figure 12:
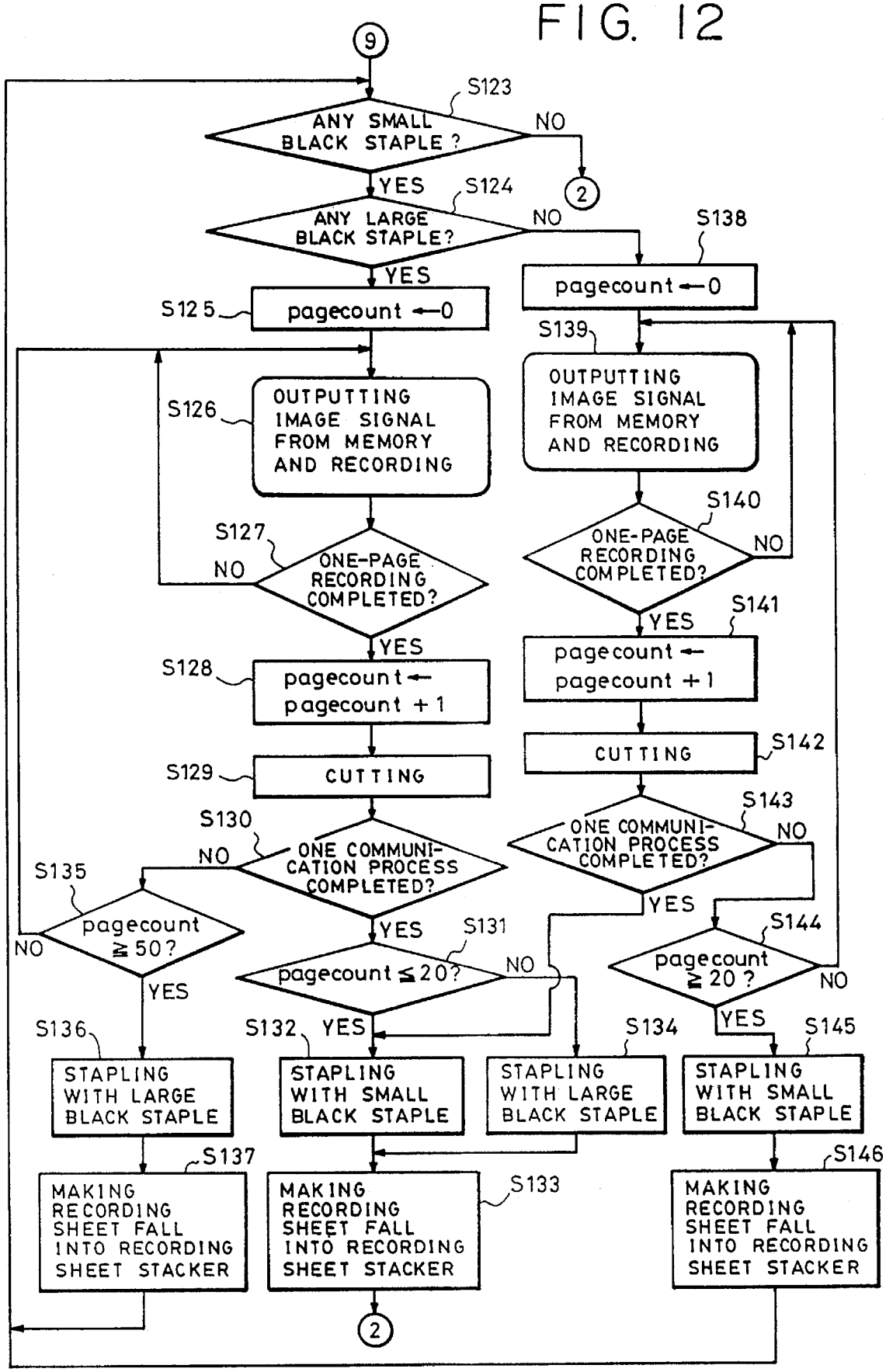

With respect to a memory output in the case of nonconfidential reception, namely when the result of determination of step 98 is "No", processing of step S123 and subsequent steps shown in FIG. 12 is executed.

First, the signal from signal line 134*a* is input and determination is made as to whether there is any small black staple (step S123). If No, the process returns to step S61 or, if Yes, a determination is made as to whether there is any large black staple (step S124). If Yes in step S124, the count value "pagecount" of the page counter for counting the number of pages for stapling is cleared (step S125) and information stored in memory circuit 144 is output and recorded (step S126). More specifically, signal "3" is output to signal line 142*f*, memory circuit 144 outputs the stored data to signal line 144*a*, and decoding circuit 122 receives and decodes the information output to the signal line 144*a*.

Then, a determination is made as to whether recording of one page is completed (step S127). If No, the process returns to step S126 or, if Yes, the count value "pagecount" of the page counter is incremented by 1 (step S128) and cutting instruction pulses are generated on signal line 142*c* to cut the recording paper (step S129). Next, determination is made as to whether recording of one communication process is completed (step S130). If No, determination is made as to whether the count value "pagecount" of the page counter is equal to or greater than 50 (step S135). If No, the process returns to step S126 or, if Yes, a signal having level "1" is output to signal line 142*j* and stapling instruction pulses are thereafter generated on signal line 142*d* to staple, with a large black staple, pieces of recording paper retained by recording paper retainer 7 (step S136). Subsequently, signal having level "0" is output to signal line 142*j* and recording paper fall pulses are generated on signal line 142*e* to make the recording paper retained by recording paper retainer 7 fall into recording paper stacker 8 (step S137). The process then returns to step S123.

If Yes in step S130, a determination is made as to whether the count value "pagecount" of the page counter is equal to or smaller than 20 (step S131). If Yes, a signal having level "1" is output to signal line 142*g* and stapling instruction pulses are thereafter generated on signal line 142*d* to staple, with a small black staple, pieces of recording paper retained by recording paper retainer 7 (step S132). A signal having level "0" is then output to signal line 142*g*. Subsequently, recording paper fall pulses are generated on signal line 142*d* to make the recording paper retained by recording paper retainer 7 fall into recording paper stacker 8 (step S133), and the process returns to step S61.

If No in step S131, pieces of recording paper retained by recording paper retainer 7 are stapled with a large black staple (step S134), and the process returns to step S133.

If no large black staples are detected in step S124, the count value "pagecount" of the page counter is cleared (step S138) and information stored in memory circuit 144 is output and recorded (step S139). More specifically, signal "3" is output to signal line 142*f*, memory circuit 144 outputs the stored data to signal line 144*a*, and decoding circuit 122 receives and decodes the information output to the signal line 144*a*.

Then, a determination is made as to whether recording of one page is completed (step S140). If No, the process returns to step S139 or, if Yes, the count value "pagecount" of the page counter is incremented by 1 (step S141) and cutting instruction pulses are generated on signal line 142*c* to perform cutting (step S142). Next, determination is made as to whether recording of one communication process is completed (step S143). If Yes, the process returns to step S132 or, if No, determination is made as to whether the count value "pagecount" of the page counter is equal to or greater than 20 (step S144). If No, the process returns to step S139 or, if Yes, pieces of recording paper retained by recording paper retainer 7 are stapled with a small black staple (step S145). Subsequently, recording paper fall pulses are generated on signal line 142*e* to make the recording paper retained by recording paper retainer 7 fall into recording paper stacker 8 (step S146), and the process returns to step S123.

The arrangement may be such that if the maximum number of sheets to be bound, which is determined according to the binding members presently applicable, is exceeded, the group of recording sheets obtained by one communication process is sectioned into subgroups to be bound separately. In this case, however, other unique binding members may be used to indicate sectioning of the subgroups obtained by one communication process, and information indicating the use of such means may be recorded.

The above-described arrangement can also be applied to copying machines, printers, electronic filing apparatuses and the like.

As described above, there are provided binding means for binding a plurality of sheets of recording paper output by a recording means with a plurality of types of binding members and a control means for analyzing an output of received information to select the binding members used by the binding means. It is thereby possible to bind recording medium sheets with one of the binding members suitable for the received information output.

The control means is arranged to analyze a signal indicating the end of recording one page of an output of received information to control the selection of binding members to be used by the binding means. It is thereby possible to bind recording sheets with one of the different types of binding members according to the number of output pages and, hence, to bind the sheets with improved reliability whether the number of pages is large or small.

The control means is also arranged to analyze information on the existence of a confidential reception designation with respect to an output of received information to control the selection of binding members to be used by the binding means. It is thereby possible to bind recording sheets with one of the different types of binding members according to the kind of output information, so that any use can easily discriminate a particular binding output.

The control means is also arranged to analyze a signal indicating the end of recording one page of an output of received information to control the selection of binding members so that one of the binding members applicable and having a greater size is selected by the binding means. Binding can therefore be effected with improved reliability even if the number of pages of the output information is increased.

There are further provided detection means for detecting the existence/non-existence of each of different types of binding members, and an output form control means for outputting recording medium sheets in the form corresponding to one communication process or one page. It is thereby possible to select the output form of the recording medium according to the existence/non-existence of each type of binding member and to output the information in a form most suitable for facilitating information management.

The output form control means is arranged to analyze an output of information received by one communication process to control the binding means so that if the number of recording medium sheets exceeds the upper limit of the number of sheets which can be bound with the binding member having the maximum size, outputs are formed by being separately bound as subgroups of the group of recording medium sheets obtained by one communication process. It is thereby possible to bind the output of received information by separating it into some sets of volumes, so that output information having a large number of pages can easily be managed.

The output form control means is also arranged to analyze an output of information received by one communication process to control the binding means so that the operation of forming separately bound outputs is started by predetermined timing, if the number of recording medium sheets exceeds the upper limit of the number of sheets which can be bound with the binding member having the maximum size. It is thereby possible to perform binding without interference with the output information receiving processing.

Consequently, binding members can be changed according to the number of pages and the kind of content of the output of received information, and recording medium sheets can be neatly bound with the selected binding member having a suitable size according to the number of pages. Also, since a particular kind of output information can be bound with a distinct binding member, it is possible for any user to discriminate particular output information from a group of categories of information.

Embodiment 4

Figure 14:
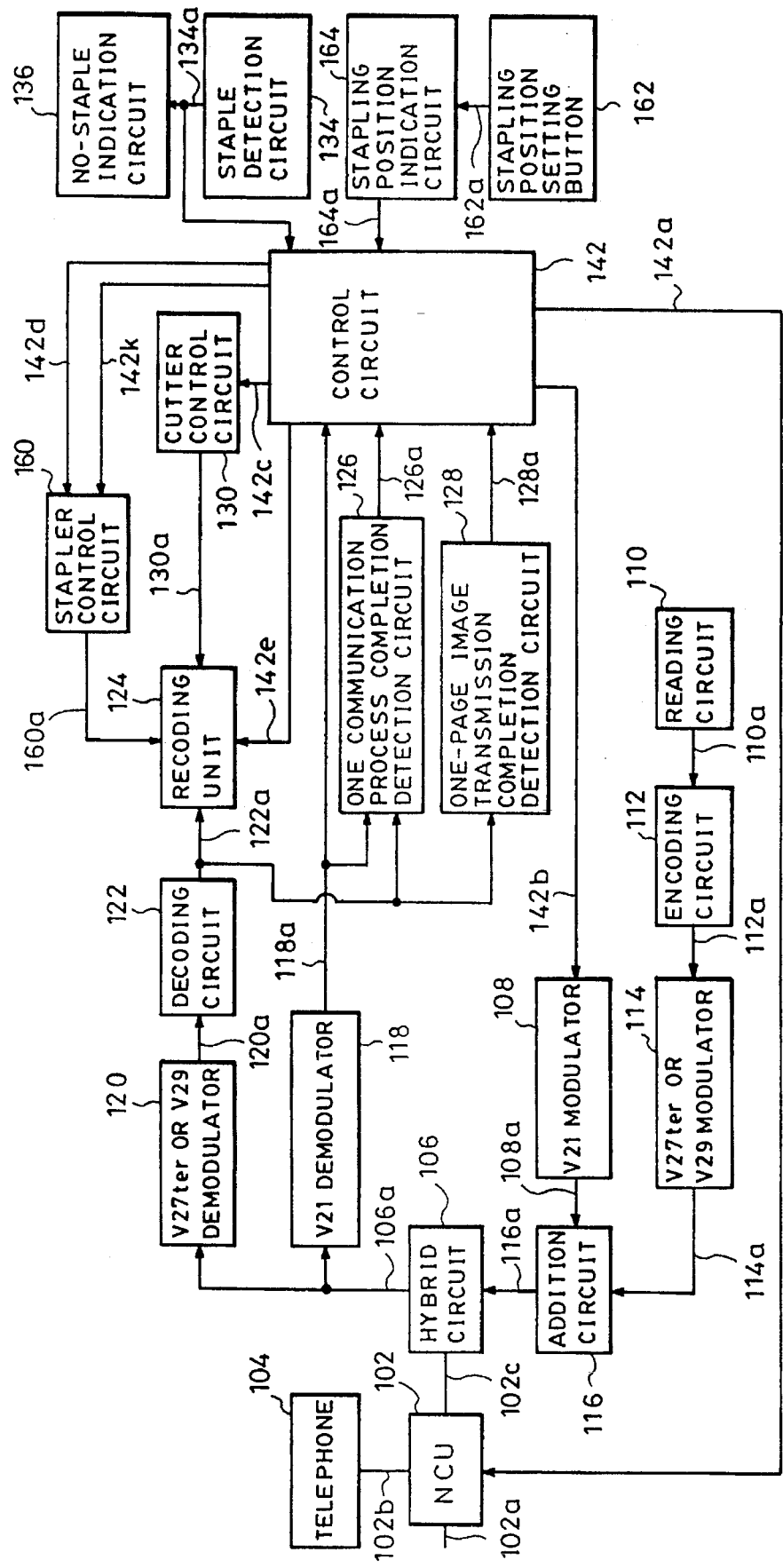
FIG. 14 is a block diagram of signal processing unit 1 in accordance with a fourth embodiment of the present invention.

A fourth embodiment of the present invention will be described below. FIG. 14 is a block diagram of signal processing unit 1 in accordance with this embodiment. Components 102 to 142 are the same as those shown in FIG. 2 and the description for them will not be repeated.

A block 160 represents a stapler control circuit for changing the stapling position according to a stapling position signal generated on a signal line 142$k$ and for driving the stapler 6 according to stapling instruction pulses generated on signal line 142$d$.

A block 162 represents a stapling position setting button for setting, from the transmitting terminal side, the position at which recording sheets on which information is recorded on the receiving terminal side are to be stapled. When the stapling position setting button 162 is depressed, pulses are generated on a signal line 162$a$. A block 164 represents a stapling position indication circuit for displaying information on the position set by the stapling position setting button 162.

When the power supply of the machine is turned on, the stapling position indication circuit 164 indicates that recording sheets are stapled at a left top corner of the recorded images on the receiving side. Thereafter, as pulses are generated on signal line 162$a$, the stapling position indication circuit 164 successively indicates stapling at right-top, left-bottom and right-bottom positions. While stapling at the left-top, right-top, left-bottom or right-bottom position is indicated on the receiving terminal, signal "0", "1", "2" or "3" is correspondingly output to signal line 164$a$.

FIG. 18 is a diagram of the arrangement for stapling position control.

As shown in FIG. 18, sheets of recording paper 3 are supported so as to be placed in the recording sheet stacker with their reverse side facing upward, and the stapler 6 inserts each staple from a bottom side, i.e., from the obverse side of recording paper 3.

The stapler 6 is mounted so as to be movable along a guide 170 around the sheets of recording paper 3. The stapler 6 is moved to a suitable position on the guide 170 by being driven with an x-y coordinate position control driver 166.

That is, the x-y coordinate position control driver 166 outputs an x-direction driving signal to a signal line 166$a$ according to data on the x-coordinate position output to a signal line 160$a$1 from the stapler control circuit 160 and thereby moves the stapler 6 in the direction along the x-axis. The x-y coordinate position control driver 166 a y-direction driving signal to a signal line 166$a$ according to data on the y-coordinate position output to a signal line 160$a$2 from the stapler control circuit 160 and thereby moves the stapler 6 in the direction along the y-axis.

The stapler 6 also has a rotary drive portion 6a which is capable of controlling the orientation of each staple and which is controlled by a stapling position control driver 168.

That is, when the stapling position control driver 168 outputs stapling instruction pulses to a signal line 160a4 and when a signal on a signal line 160a3 is "0", stapling is performed by setting the orientation of each staple to a horizontal direction (—), as shown in FIG. 19. Similarly, when the signal on signal line 160a3 is "1", "2", or "3", stapling is performed by setting the orientation of each staple to a vertical direction (|), a left-up direction (\), or a right-up direction (/), respectively.

According to this arrangement, in the case of stapling at a position corresponding to the left top corner of an original of A4 size transported in the longitudinal direction, recording sheets of A4 size discharged so that the reverse surfaces thereof face upward are stapled at a left bottom position. Corresponding (x, y) coordinate data is (0 mm, 0 mm), and values "0", "0" are output to signal lines 160a1 and 160a2. The orientation of staple is the left-up direction (\), and signal "2" is output to signal line 160a3.

In the case of stapling at a position corresponding to the right top corner of an original of A4 size laterally transported, recording sheets of A4 size discharged so that the reverse surfaces thereof face upward are stapled at a right bottom position. Corresponding (x, y) coordinate data is (210 mm, 210 mm), and values "210", "0", are output to signal lines 160a1 and 160a2. The orientation of staple is the right-up direction (/), and signal "3" is output to signal line 160a3.

FIG. 21 is a table of values of coordinate data and orientation data for stapling at the left-top, right-top, left-bottom and right-bottom positions of A4 and A5 originals by the above-described method. The stapler control circuit 160 outputs such data to signal lines 160a1, 160a2 and 160a3 and thereafter outputs stapling instruction pulses to signal line 160a4.

In this manner, the stapling position and the stapling direction are selected to effect stapling at an optimal position.

Figure 15:
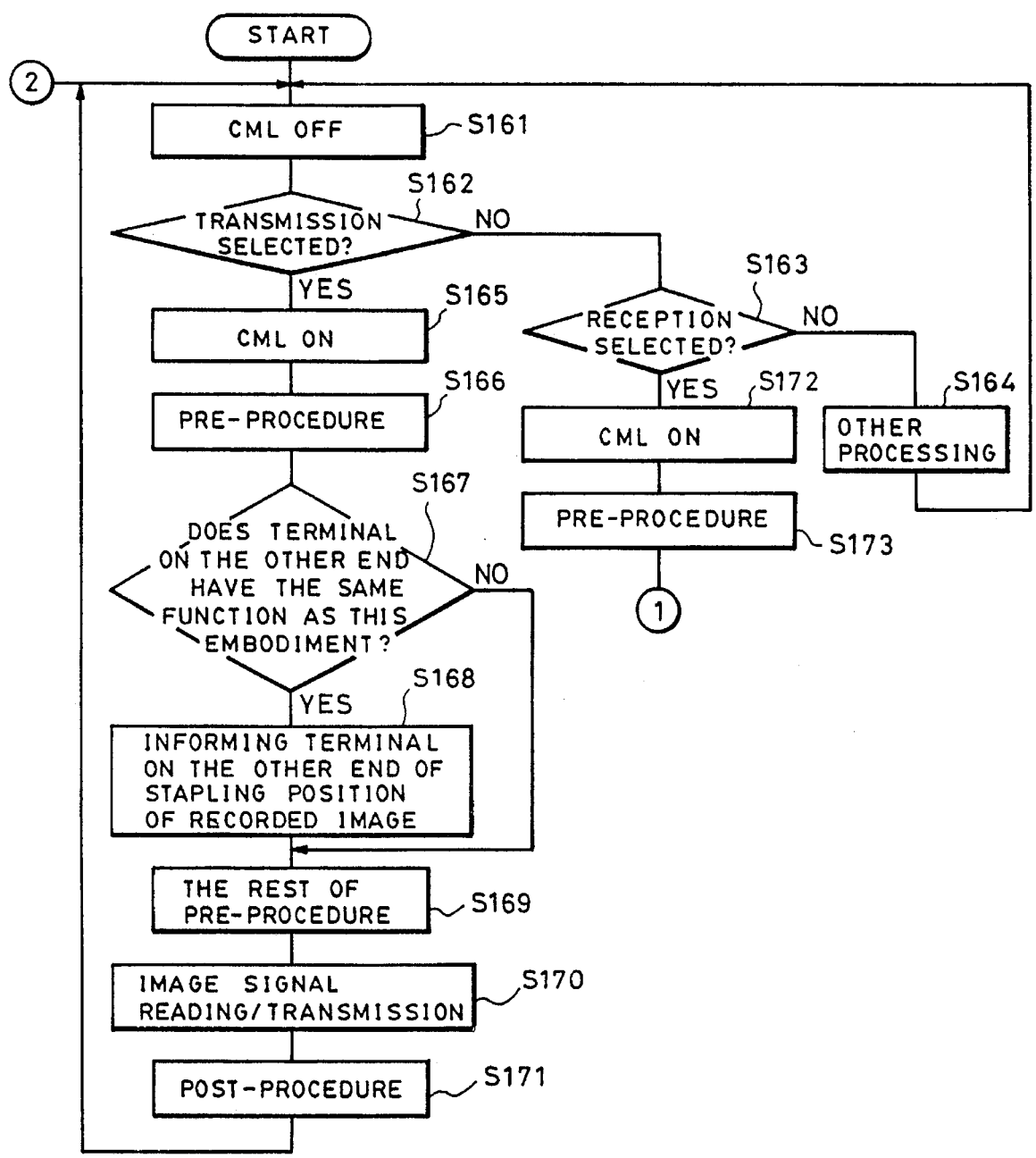
FIG. 15 is a flowchart of control of control circuit 142 of the fourth embodiment.
Figure 16:
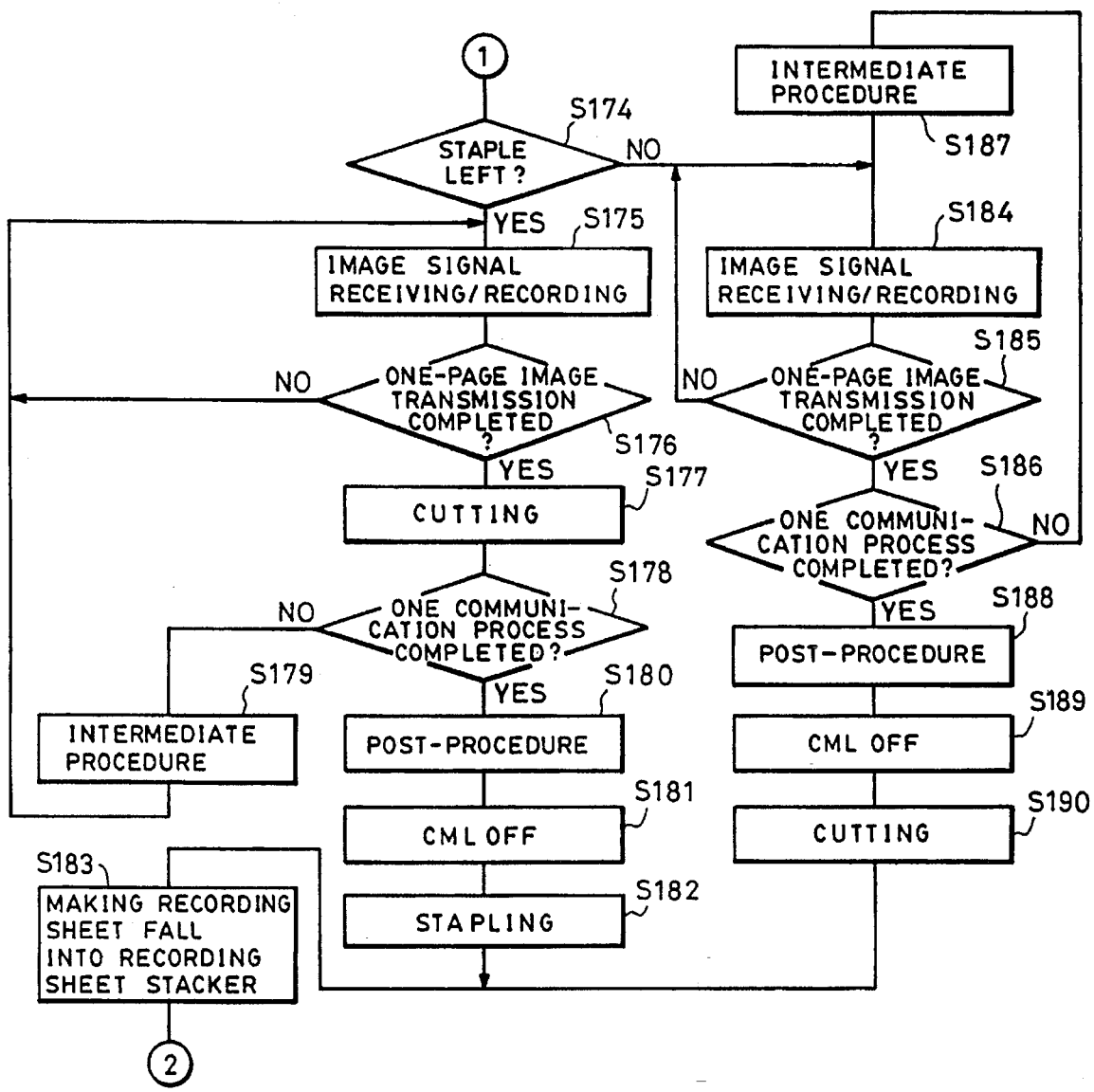
FIG. 16 is another flowchart of control of control circuit 142 of the fourth embodiment.

FIGS. 15 and 16 are flowcharts of the control operation of the control circuit 142.

First, the control circuit 142 sets the signal level of the signal line 142a to "0" to turn off the CML (step S161). Determination is made as to whether transmission is selected (step S162) and, if not, whether reception is selected (step S163). If neither of them is selected, some other processing is conducted (step S164) and the process returns to step S161.

If transmission is selected in step S162, the signal level of signal line 142a is set to "1" to turn on the CML (step S165) and a pre-procedure is executed (step S166). Then, a determination is made as to whether the receiving terminal at the other end of the line has the specific functional mode of this embodiment, i.e., the functional mode for selecting the stapling position before stapling (step S167). If Yes, the other-end receiving terminal is informed of the stapling position on recording sheets (step S168). More specifically, the 48th and 49th bits of NSS signal are assigned and the selected stapling position is the left top position if these bits are "00", the right top position if these bits are "10", the left bottom position if these bits are "01" or the right bottom position if these bits are "11".

The rest of the pre-procedure is executed (step S169), image signal reading/transmission is performed (step S170), and a post-procedure is executed (step S171). The process then returns to step S161.

If reception is selected in step S163, the signal level of signal line 142a is set to "1" to turn on the CML (step S172) and a pre-procedure is executed (step S173). In step S173, a declaration is made to the other-end transmitting terminal by using an initial discrimination signal of the fact that the terminal at this end has the specific functional mode of this embodiment, i.e., the functional mode for selecting the stapling position before stapling, and, if the other-end terminal designates the stapling position on recorded images, the stapler control circuit 160 is informed of this designated position. More specifically, if the 48th and 49th bits of NSS signal are "00", the stapling position is the left-top position, and signal "0" is therefore output to signal line 142d, as described above. Similarly, the 48th and 49th bits of NSS signal are "10", "01" or "11" the stapling position is the right-top, left-bottom or right-bottom position and signal "1", "2" or "3" is output to signal line 142d. If the other-end terminal does not designate the stapling position on the recorded images, the stapling position is set to the left-top position and signal "0" is output to signal line 142k.

Next, the control circuit 142 is supplied with the signal from signal line 134a to check whether there are staples left (step 174). If there are some staple, the process proceeds to step S175 or, if there is no staple, the process proceeds to step S184.

In step S175, image signals are received and received images are recorded and output. Determination is made by using the signal from signal line 128a as to whether one-page image transmission is completed (step S176). When one-page image transmission is completed, cutting instruction pulses are generated to perform cutting (step S177). If one-page image transmission is not completed, the process returns to step S175 to continue image signal receiving/recording.

When cutting of step 177 is finished, the signal from signal line 126a is input and determination is made as to whether one communication process is completed (step S178). If one communication process is not completed, an intermediate procedure is executed (step S179) and the process returns to step S175 to perform image signal receiving/recording.

When one communication process is completed, a post-procedure is executed (step S180) and the signal level of signal line 142a is set to "0" to turn off the CML (S181). Stapling is effected by generating instruction pulses on signal line 142d and designating the stapling position on recording sheets on which images have been recorded and which are retained by the recording paper retainer (step S182).

Thereafter, recording paper fall pulses are generated on signal line 142e to make the stapled image output recording sheets retained by the recording paper retainer fall into the recording paper stacker (step S183).

If it is determined in step 174 that no staple is left, image signal receiving is performed and received images are recorded and output (step S184). Determination is made by using the signal from signal line 128a as to whether one-page image transmission is completed (step S185). If one-page image transmission is not completed, the process returns to step S184 to continue image signal receiving/recording.

When one-page image transmission is completed, the signal from signal line 126a is input and a determination is made as to whether one communication process is completed (step S186). If one communication process is not completed, an intermediate procedure is executed (step S187) and the process returns to step S184 to perform image signal receiving/recording.

When one communication process is completed, a post-procedure is executed (step S188) and the signal level of signal line 142a is set to "0" to turn off the CML (step S189). Cutting instruction pulses are generated to perform cutting (step S190), and image output recording sheets thereby cut are made to fall into the recording paper stacker (step S183).

As described above, if there are no staples, images obtained by one communication process are recorded on one continuous sheet of recording paper without being separated, so that pages of the recorded images can be maintained as one set and records obtained in this manner can easily be sorted.

The stapling position may be selected in such a manner that if an A4 size original in the ordinary longitudinal position is transmitted/received, the stapling position is automatically set to a left top position as shown in FIG. 17(A), or, if an A5 size original is transmitted while being rotated clockwise by 90°, the stapling position is automatically set to a right top position as shown in FIG. 17(B).

In the above-described embodiments, sheets of recording paper 3 are stacked in the recording paper stacker with their reverse surfaces facing upward. However, the recording apparatus may be arranged to place recording sheets so that the obverse surfaces face upward. That is, in some copying machines, originals set with their obverse surfaces facing upward are successively read from the last page at the lowermost position to record images, and output recording sheets are superposed one on another from the last page so that the obverse surfaces face upward. In this case, the recording sheets are processed with the obverse surfaces facing upward.

To change the stapling position, the position of recording sheets may be changed instead of moving the stapler 6.

In the above-described embodiments, the lengthwise recording sheet is cut by a length corresponding to one communication process if there is no staple in step S174. However, this method is not exclusively used, and the recording sheet may be simply cut with respect to pages. The embodiments have been described mainly with respect to the image transmitting/receiving operation. However, a similar process may be used for copying.

The design of the above apparatuses in accordance with the above-described embodiments assumes that a paper roll is used but they may also be of a type using cut paper sheets.

Examples of the construction of a facsimile machine have been described as embodiments of the present invention. However, the present invention can also be applied to copying machines, printers and electronic filing apparatuses in a similar manner. In a copying machine, in accordance with the present invention, a means for detecting the selected size and direction of each recording sheet may be provided and the stapling position may be changed according to the result of this detection, or a staple position selecting key may be provided and operated to designate the stapling position as desired. Also, in a copying machine, a means for detecting the direction of originals may be provided and the stapling position may be changed according to the detected original direction. In a copying machine or an electronic file in accordance with the present invention, a means for discriminating the direction of output images may be provided and the stapling position may be selected according to the discriminated direction of the images.

In a printer in accordance with the present invention, stapling is performed according to data on the printing direction transmitted from a data transmitting terminal such as a host computer, or the stapling position is set to a position designated from the data transmitting terminal.

As described above, recording sheets can be bound at an optimal position according to the size and direction of recorded images, and a recording apparatus which can easily be used can be provided.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims.

What is claimed is:

1. A recording apparatus comprising:
   recording means for recording images on a recording sheet of at least a predetermined size and a size larger than said predetermined size;
   binding means for binding with a binding member a plurality of recording sheets of the predetermined size on which images are recorded by said recording means;
   detection means for detecting the existence of a binding member in said binding means; and
   control means for controlling said recording means and binding means so that, upon detection of the existence of said binding member, images are recorded on the plurality of recording sheets of the predetermined size and the plurality of recording sheets are bound, and that, upon failure to detect the existence of said binding member, the images are recorded on one recording sheet of the size larger than said predetermined size.

2. A recording apparatus according to claim 1, wherein said control means initiates binding by said binding means when a process of recording images of one document by said recording means is completed.

3. A recording apparatus according to claim 1, further comprising communication means for receiving image data, wherein said recording means records images based on image data received by said communication means and said control means controls said binding means according to code data following the image data received by said communication means.

4. A recording apparatus according to claim 3, wherein said recording apparatus is a facsimile machine.

5. A recording apparatus according to claim 1, wherein said binding means comprises a stapler and said binding member is a staple.

6. A recording apparatus according to claim 1, wherein said detection means detects the existence of the binding member before commencement of the recording by said recording means.

7. A recording apparatus according to claim 1, wherein said recording apparatus is one of a copying machine, a printer and an electronic filing apparatus.

8. A recording method comprising:
   recording images on a recording sheet of at least a predetermined size and a size larger than the predetermined size;
   binding with a binding member a plurality of recording sheets of the predetermined size on which images are recorded in said recording step;
   detecting the existence of a binding member for binding the plurality of recording sheets; and
   controlling said recording step and binding step so that, upon detection of the existence of the binding member, images are recorded on the plurality of recording sheets of the predetermined size and the plurality of recording sheets are bound, and that, upon failure to detect the existence of the binding member, the images are recorded on one recording sheet of the size larger than the predetermined size.

9. A recording method according to claim 8, wherein, in said controlling step, binding is initiated when a process of recording images of one document in said recording step is completed.

10. A recording method according to claim 8, further comprising receiving image data, wherein said recording step records images based on image data received in said receiving step and said controlling step controls said binding step according to code data following the image data received in said receiving step.

11. A recording method according to claim 10, wherein said recording step is performed using a facsimile machine.

12. A recording method according to claim 8, wherein said binding step is performed using a stapler and the binding member is a staple.

13. A recording method according to claim 8, wherein said detecting step detects the existence of the binding member before said recording step is performed.

14. A recording method according to claim 8, wherein said recording step is performed using one of a copying machine, a printer and an electronic filing apparatus.

15. A recording apparatus comprising:
recording means for recording images on a recording sheet;
cutting means for cutting said recording sheet on which images are recorded in a direction perpendicular to its lengthwise direction to produce cut sheets;
binding means for binding with a binding member a plurality of said cut recording sheets;
detection means for detecting the existence of a binding member in said binding means; and
control means for controlling said cutting and binding means so that upon detection of said the existence of binding member the cutting means cuts the recording sheet by a unit length corresponding to a page and the binding means binds a plurality of cut recording sheets and that upon failure to detect the said binding member the cutting means cuts the recording sheet by a unit length corresponding to one document.

16. A recording apparatus according to claim 15, wherein said recording apparatus comprises one of a facsimile machine, a copying machine, a printer and an electronic filing apparatus.

17. A recording apparatus according to claim 15, wherein said binding means comprises a stapler and said binding member is a staple.

18. A recording method comprising:
recording images on a recording sheet;
cutting the recording sheet on which images are recorded in a direction perpendicular to a lengthwise direction of the recording sheet to produce cut sheets;
binding with a binding member a plurality of the cut recording sheets;
detecting the existence of a binding member for binding the cut recording sheets; and
controlling said cutting and binding steps so that upon detection of the existence of the binding member, the recording sheet is cut by a unit length corresponding to a page and a plurality of cut recording sheets are bound, and that upon failure to detect the binding member, the recording sheet is cut by a unit length corresponding to one document.

19. A recording method according to claim 18, wherein said recording step is performed using one of a facsimile machine, a copying machine, a printer and an electronic filing apparatus.

20. A recording method according to claim 18, wherein said binding step is performed using a stapler and the binding member is a staple.

21. A recording apparatus comprising:
means for receiving input image data;
recording means for recording an image on a recording sheet based on said input image data;
binding means for binding with a binding member a plurality of said recording sheets on which images are recorded by said recording means;
detection means for detecting the existence of a binding member in said binding means;
memory means for storing said input image data upon receipt; and
control means for controlling said recording and binding means so that, upon detection of the existence of said binding member, images based on said input data are recorded on recording sheets which are thereafter bound, and that, upon failure to detect the existence of the binding member, the image data is stored in said memory means.

22. A recording apparatus according to claim 21, further comprising command means for signalling a command to record images based on the image data stored by said memory means, wherein said control means initiates recording in response to the signal from said command means.

23. A recording apparatus according to claim 21, wherein said control means initiates binding by said binding means when a process of recording images of one document by said recording means is completed.

24. A recording apparatus according to claim 21, further comprising communication means for receiving image data, wherein said recording means records images based on image data received by said communication means and said control means controls said binding means according to code data following the image data received by said communication means.

25. A recording apparatus according to claim 24, wherein said recording apparatus is a facsimile machine.

26. A recording apparatus according to claim 21, wherein said binding means comprises a stapler and said binding member is a staple.

27. A recording apparatus according to claim 21, wherein said detection means detects the existence of the binding member before commencement of the recording by said recording means.

28. A recording apparatus according to claim 21, wherein said recording apparatus is one of a copying machine, a printer and an electronic filing apparatus.

29. A recording method comprising:
receiving input image data;
recording an image on a recording sheet based on the received input image data;
binding with a binding member a plurality of the recording sheets on which images are recorded during said recording step;
detecting the existence of a binding member for binding the plurality of the recording sheets;

storing the received input image data; and controlling said recording and binding steps so that, upon detection of the binding member, images based on the input data are recorded on recording sheets which are thereafter bound, and that, upon failure to detect the existence of the binding member, the image data is stored.

30. A recording method according to claim 29, further comprising the step of signalling a command to record images based on the image data stored in said storing step, wherein in said controlling step, recording is initiated in response to the command signalled in the signalling step.

31. A recording method according to claim 29, wherein in said controlling step, binding is initiated when said recording step for recording images of one document is completed.

32. A recording method according to claim 29, further comprising receiving image data, wherein said recording step records images based on received image data and said controlling step controls said binding step according to code data following the received image data.

33. A recording method according to claim 32, wherein said recording step is performed using a facsimile machine.

34. A recording method according to claim 29, wherein said binding step is performed using a stapler and the binding member is a staple.

35. A recording method according to claim 29, wherein said detection step detects the existence of the binding member before said recording step begins.

36. A recording method according to claim 29, wherein said recording step is performed using one of a copying machine, a printer and an electronic filing apparatus.

* * * * *

UNITED STATES PATENT AND TRADEMARK OFFICE
CERTIFICATE OF CORRECTION

PATENT NO. : 5,551,679
DATED : September 3, 1996
INVENTOR(S) : TAKEHIRO YOSHIDA, ET AL.

It is certified that error appears in the above-indentified patent and that said Letters Patent is hereby corrected as shown below:

COLUMN 1:

Line 17, "multi,page" should read --multi-page--.

COLUMN 7:

Line 10, "in,step" should read --in step--.

COLUMN 10:

Line 39, "signal "1110)" should read --signal "1110".

COLUMN 13:

Line 5, "(step Sill)," should read (step S111),--.

Line 18, "line ! 42e" should read --line 42e--.

UNITED STATES PATENT AND TRADEMARK OFFICE
CERTIFICATE OF CORRECTION

PATENT NO. : 5,551,679  Page 2 of 2
DATED : September 3, 1996
INVENTOR(S) : TAKEHIRO YOSHIDA, ET AL.

It is certified that error appears in the above-indentified patent and that said Letters Patent is hereby corrected as shown below:

COLUMN 14:

Line 30, "and-the" should read --and the--.

COLUMN 21:

Line 40, "said" should be deleted.

Line 41, "binding" should read --said binding--.

Line 44, "the said" should read --said--.

Signed and Sealed this

Eleventh Day of February, 1997

Attest:

BRUCE LEHMAN

Attesting Officer  Commissioner of Patents and Trademarks